United States Patent [19]
Omura et al.

[11] Patent Number: 5,592,506
[45] Date of Patent: Jan. 7, 1997

[54] MSK SPREAD-SPECTRUM RECEIVER WHICH ALLOWS CDMA OPERATIONS

[75] Inventors: Jimmy K. Omura, Cupertino; Paul T. Yang, Sunnyvale, both of Calif.; Gurgen H. Khachatrian, Yerevan, Argentina; Karen M. Nikogossian, Yerevan, Argentina; Karen S. Hovakimian, Yerevan, Argentina; Armen L. Vartapetian, Yerevan, Argentina

[73] Assignee: Cylink Corporation, Sunnyvale, Calif.

[21] Appl. No.: 324,478

[22] Filed: Oct. 17, 1994

[51] Int. Cl.$^6$ .............................. H04B 15/00; H04K 1/00; H04L 27/30
[52] U.S. Cl. .............................. 375/207; 329/300
[58] Field of Search .............................. 375/200, 201, 375/202, 203, 204, 205, 206, 207, 208, 209, 210, 271, 274, 324, 325, 334, 336, 254, 285; 329/300, 303

[56] References Cited

U.S. PATENT DOCUMENTS

| | | | |
|---|---|---|---|
| 4,189,677 | 2/1980 | Cooper et al. | 325/321 |
| 4,285,060 | 8/1981 | Cobb et al. | 375/1 |
| 4,392,232 | 7/1983 | Andren et al. | 375/86 |
| 4,484,335 | 11/1984 | Mosley et al. | 375/1 |
| 4,528,674 | 7/1985 | Sweeney et al. | 375/208 |
| 4,538,280 | 8/1985 | Mosley et al. | 375/1 |
| 4,606,039 | 8/1986 | Nicolas et al. | 375/1 |
| 4,621,365 | 11/1986 | Chiu | 375/1 |
| 4,630,283 | 12/1986 | Schiff | 375/1 |
| 4,653,069 | 3/1987 | Roeder | 380/31 |
| 4,672,629 | 6/1987 | Beier | 375/1 |
| 4,675,839 | 6/1987 | Kerr | 364/821 |
| 4,707,839 | 11/1987 | Andren et al. | 375/1 |
| 4,730,340 | 3/1988 | Frazier, Jr. | 375/207 |
| 4,901,307 | 2/1990 | Gilhousen et al. | 370/18 |
| 4,969,159 | 11/1990 | Belcher et al. | 375/1 |
| 5,022,047 | 6/1991 | Dixon et al. | 375/1 |
| 5,103,459 | 4/1992 | Gilhousen et al. | 375/1 |
| 5,120,997 | 6/1992 | Cantwell | 375/208 |
| 5,422,908 | 6/1995 | Schilling | 375/203 |

FOREIGN PATENT DOCUMENTS 0265178  10/1987  European Pat. Off. .

Primary Examiner—Wellington Chin
Assistant Examiner—Huong Luu
Attorney, Agent, or Firm—David Newman & Associates, P.C.

[57] ABSTRACT

A method for demodulating a received spread-spectrum signal using a minimum-shift-keyed (MSK) receiver. Using the method, an in-phase-component signal and a quadrature-phase-component signal are generated from a received spread-spectrum signal. The in-phase-component signal and the quadrature-phase-component signal are then processed and combined in such a way as to estimate data of the received-spread-spectrum signal.

19 Claims, 9 Drawing Sheets

FIG. 6

| | | |
|---|---|---|
| 1 | $y_1$ | 1 |
| $a_L$ | $x_N$ | 1 |
| $a_L$ | $x_{N-1}$ | $a_L$ |
| . | $x_{N-2}$ | $a_L$ |
| . | . | $a_L$ |
| . | . | . |
| . | . | . |
| $a_3$ | . | . |
| $a_3$ | $x_7$ | $a_3$ |
| $a_2$ | $x_6$ | $a_3$ |
| $a_2$ | $x_5$ | $a_2$ |
| $a_1$ | $x_4$ | $a_2$ |
| $a_1$ | $x_3$ | $a_1$ |
| 1 | $x_2$ | $a_1$ |
| | $x_1$ | |

FIG. 7

| | | |
|---|---|---|
| 1 | $x_N$ | 1 |
| $a_L$ | $x_{N-1}$ | 1 |
| $a_L$ | $x_{N-2}$ | $a_L$ |
| . | . | $a_L$ |
| . | . | . |
| . | . | . |
| . | . | . |
| $a_3$ | $x_7$ | . |
| $a_3$ | $x_6$ | $a_3$ |
| $a_2$ | $x_5$ | $a_3$ |
| $a_2$ | $x_4$ | $a_2$ |
| $a_1$ | $x_3$ | $a_2$ |
| $a_1$ | $x_2$ | $a_1$ |
| 1 | $x_1$ | $a_1$ |
| | $x_N$ | |

MSK SPREAD-SPECTRUM RECEIVER WHICH ALLOWS CDMA OPERATIONS

BACKGROUND OF THE INVENTION

This invention relates to spread-spectrum communications, and more particularly to an minimum shift keyed (MSK) receiver which can be used in a code division multiple access (CDMA) spread-spectrum communications environment.

DESCRIPTION OF THE RELEVANT ART

Using MSK modulation is desirable because this type of modulation has a constant envelope signal and can be used with a more efficient Class C amplifier. Also, signals using MSK modulation have a steeper out-of-band signal-energy roll-off, which reduces interference to adjacent channels. Unfortunately, the use of conventional frequency modulation (FM) discriminators in a typical MSK receiver creates a nonlinearity before the spread-spectrum codeword digital correlators. CDMA operation with an MSK receiver using an FM discriminator is therefore not desirable.

SUMMARY OF THE INVENTION

A general object of the invention is an MSK receiver which can receive spread-spectrum signals.

Another object of the invention is an economical approach to receiving spread-spectrum signals.

According to the present invention, as embodied and broadly described herein, an MSK receiver and method is provided for receiving spread-spectrum signals. The method comprises the steps of generating an in-phase-component signal and a quadrature-phase-component signal from the received-spread-spectrum signal; processing the in-phase-component signal using $\sin_{doub}S(n,C)$ to generate a first processed signal, and using $\cos_{doub}S(n,C)$ to generate a third processed signal; processing the quadrature-phase-component signal using $\sin_{doub}S(n,C)$ to generate a second processed signal, and using $\cos_{doub}S(n,C)$ to generate a fourth processed signal.

For noncoherent reception, the third processed signal is combined with the second processed signal to generate a first combined signal, and the third processed signal is combined with an inverse of the second processed signal to generate a second combined signal. The first processed signal is combined with the fourth processed signal to generate a third combined signal, and an inverse of the first processed signal is combined with the fourth processed signal to generate a fourth combined signal. From the first combined signal, the second combined signal, the third combined signal and the fourth confined signal, the method determines an estimate of the data contained in the received-spread-spectrum signal.

For differentially coherent reception, the method combines the third processed signal with an inverse of the second processed signal to generate a first combined signal. The first processed signal is combined with the fourth processed signal to generate a second combined signal. An angle is determined from the first combined signal and the second combined signal. From the angle the method determines an estimate of the data contained in the received-spread-spectrum signal.

For differentially coherent reception of special type of codewords, the third processed signal and the fourth processed signal need not be generated. Instead, the method combines the first processed signal with a delayed version of the second processed signal to generate a first combined signal, and combines a delayed version of the first processed signal with the second processed signal to generate a second combined signal. An angle is determined from the first combined signal and the second combined signal. From the angle the method determines an estimate of the data contained in the received-spread-spectrum signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 6 illustrates an output of a first matched filter which is matched to $\cos_{doub}S(n,C)$;

FIG. 7 illustrates an output of a second matched filter which is matched to $\sin_{doub}S(n,C)$;

DETAILED DESCRIPTION OF THE PREFERRED EMBODIMENTS

Figure 1:
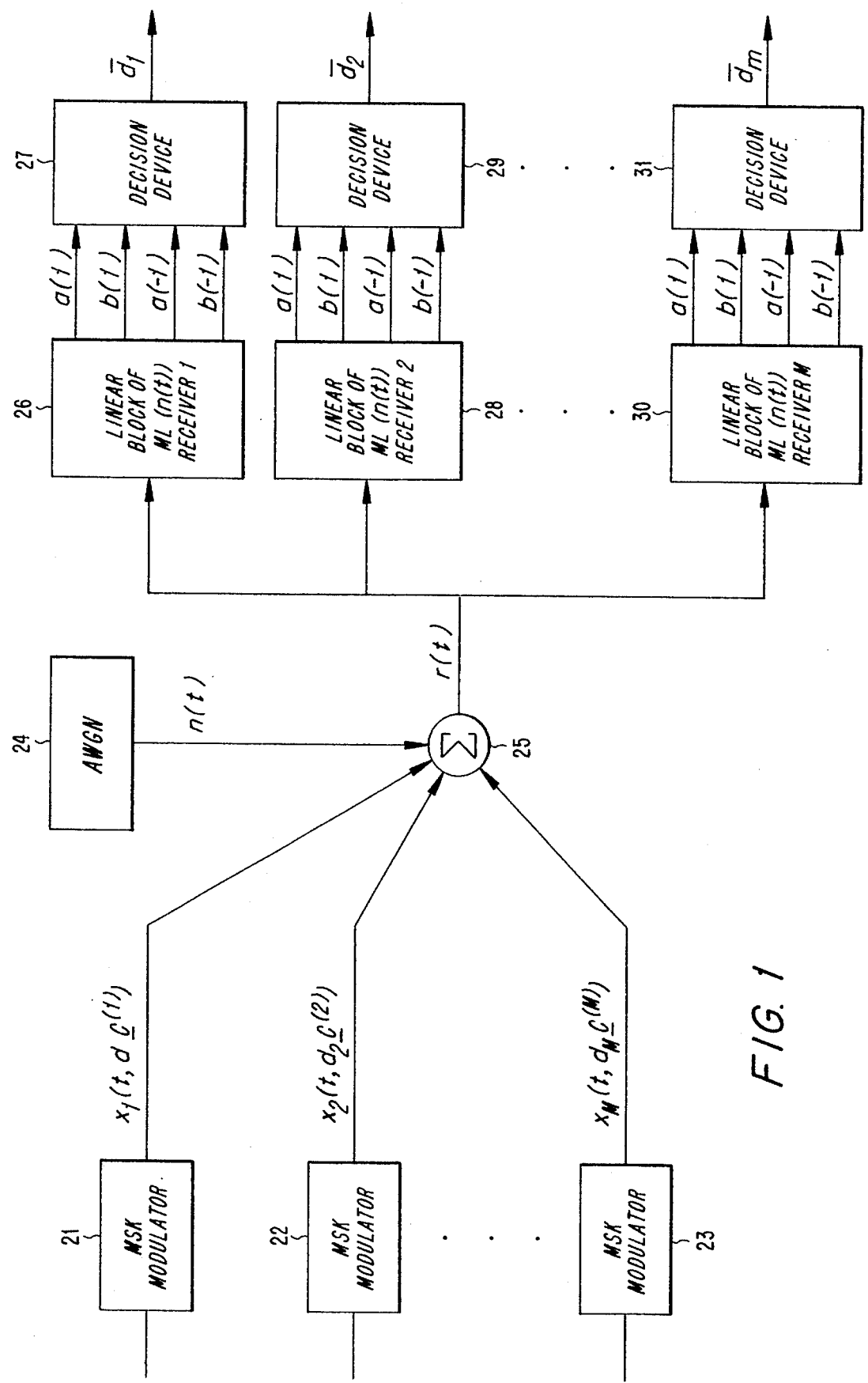
FIG. 1 illustrates a model of a spread-spectrum CDMA system with MSK modems.

Reference now is made in detail to the present preferred embodiments of the invention, examples of which are illustrated in the accompanying drawings, wherein like reference numerals indicate like elements throughout the several views.

A novel noncoherent MSK receiver structure is disclosed for receiving spread-spectrum MSK modulation. The MSK receiver structure allows CDMA operation because the MSK receiver's front end to the output of the correlators is linear. The nonlinear operation due to noncoherent demodulation follows the correlators.

The primary new implementation requirements for this type of receiver are analog-to-digital (A/D) samples into the correlators, four instead of two sets of sample registers, and frequency stability comparable to that for coherent binary phase-shift-keyed (BPSK) systems.

A set of orthogonal, codewords is presented. "Orthogonal" is used in the sense of zero interuser interference at the output of the receiver. A differentially coherent spread-spectrum MSK receiver also is presented as well as minimum interuser interference conditions in a synchronous code division multiple access (S-CDMA) environment with such receivers.

NONCOHERENT SPREAD-SPECTRUM MSK RECEIVER

This section presents the conditions for zero interuser interference, and represents the sub-optimal noncoherent spread-spectrum MSK receiver with sufficiently simple structure. The set of orthogonal, in the sense of the zero interuser interference at the output of the receiver, codewords is presented. The design of a differentially coherent spread-spectrum MSK receiver also is presented as well as minimum interuser interference conditions in S-CDMA with such receivers.

FIG. 1 illustratively shows the model of a synchronous CDMA system with spread-spectrum MSK modems. A plurality of MSK modulators 21, 22, 23 receive data $d_1$. The outputs of the modulators are $x_1(d_1, C^1)$, $x_2(t, d_2, C^2)$, ..., $x_M(t_M, C^M)$. The outputs are sent over a communications channel, and additive white gaussian noise (AWGN) 24 is added 25 to the signals. The combined signal from the channel are r(t).

A plurality of blocks of receivers, 26, 28, 30 with each receiver having the maximum likelihood receiver, are coupled to a plurality of decision devices 27, 29, 31. Accordingly, the block of maximum likelihood receivers 26 would be coupled to decision device 27. A second linear block of maximum likelihood receivers 28 would be coupled to decision device 29. The $M^{th}$ linear block of maximum likelihood receivers 30 would be coupled to decision device 31.

The spread-spectrum MSK transmitter signal is a constant envelope signal that depends on the whether the data bit "d" is +1 or −1. Assume that for each data bit "d" the N chip sequence into the MSK modulator is given by $d\underline{C}$. That is, for a conventional "1" data bit, the chip sequence into the MSK modulator is $\underline{C}$, corresponding to d=1, and for a conventional "0" data bit, corresponding to d=−1, the chip sequence into the MSK modulator is $-\underline{C}$. During the time interval when a single data bit "d" is being sent, the constant envelope MSK signal includes the modulation of the N chip sequence $d\underline{C}$.

Referring to the model in FIG. 1, there are M-users, each of which are independent. One of the M-users, say user i, sends a ±1 data bit $d_i$ by means of spread-spectrum MSK modulation, encoding his information bits $d_i$ into $\underline{C}^{(i)}$ if $d_i=1$ ("1") , and $-\underline{C}^{(i)}$ if $d_i=-1$ ("0"). Sequence $\underline{C}^{(i)}$ includes the symbols $$C_n^i = \pm 1, n = \overline{0, N-1}$$

which are called chips. The transmitted spread-spectrum MSK signal at the output of the modulator is $$x_i(t,d,\underline{C}^{(i)}) = A\cos\{w_o t + p(t, d_i\underline{C}^{(i)}) + \phi_i\} \quad (1)$$

where $$p(t,d_i\underline{C}^{(i)}) = d_i c_n 90°\left(\frac{t-nT}{T}\right) + 90° \sum_{j=0}^{n-1} d_i c_j^{(i)} \quad (2)$$

during the time interval $nT < t \leq (n+1)T$

The phase state is defined as $$S(0,\underline{C}) = 0° \quad (2a)$$

$$S(n,\underline{C}^{(i)}) = 90° \sum_{j=0}^{n-1} C_j^{(i)},$$

$$n = \overline{1, N-1}$$

The phase $\phi_i$ is the unknown phase that is equally likely to be anywhere between 0° and 360°. If this signal $x_i(t,d_i\underline{C}^{(i)})$ were distorted by Additive White Gaussian Noise (AWGN) n(t) then the maximum likelihood (ML) noncoherent receiver at first calculates $$a(d) = \int_0^{T^b} y(t)\cos\{\omega_o t + p(t,d\underline{C}^{(i)})\}dt \quad (3a)$$

$$b(d) = \int_0^{T_b} y(t)\sin\{\omega_o t + p(t,d\underline{C}^{(i)})\}dt \quad (3b)$$

for d=1 and d=−1, respectively, where $$y(t) = X_i(t, d_i\underline{C}^{(i)}) + n(t) \quad (4)$$

and then makes the decision:
Choose the data bit $d_i$ to be "1" if and only if $$\sqrt{a(1)^2 + b(1)^2} > \sqrt{a(-1)^2 + b(-1)^2} \quad (5)$$

Such receiver is assigned to each user of FIG. 1.
The signal at the input of each receiver is $$r(t) = \sum_i^M x_i(t,d_i\underline{C}^{(i)}) + n(t), \quad (6)$$

where n(t) is AWGN.

The signal r(t) at the input of the $i^{th}$ receiver, in addition to the AWGN, also contains the interference noise $$\sum_{\substack{k=1 \\ k \neq i}}^M X_k(t,d_k\underline{C}^{(k)})$$

In order to avoid the interference noise influence on the estimation of the data bit $d_i$, the interference noise is eliminated at the output of linear block of the receiver before doing nonlinear operation.

Thus, due to linearity of the first blocks of the receivers, the zero interuser interference conditions for the $i^{th}$ user in a S-CDMA system with spread-spectrum MSK modulation (1) (2) are $$a_i^{(k)}(d) \equiv \int_0^{T_b} x_k(t,d_k\underline{C}^k)\cos\{\omega_o t + p(t,d\underline{C}^{(i)})\}dt = 0 \quad (7a)$$

$$b_i^{(k)}(d) \equiv \int_0^{T_b} x_k(t,d_k\underline{C}^{(k)})\sin\{\omega_o t + p(t,d\underline{C}^{(i)})\}dt = 0 \quad (7b)$$

where d=±1, k=$\overline{1,M}$, k≠i
In this model, bit and chip synchronization are assumed, but the initial phases of the signals of the different users are arbitrary. Synchronization is assumed also for the receiver.

The conditions in equations 7(a) and 7(b) are simplified by using the signal representation (1), (2), (2a) and well known trigonometrical relationships. Assuming that the d=1, $d_k=1$ yields $$a_i^{(k)}(1) = \sum_{n=0}^{N-1} \int_{nT}^{(n+1)T} \cos\left\{\omega_o t + c_n^{(k)} 90°\left(\frac{t-nT}{T}\right) + \right.$$

-continued $$S(n,\underline{C}^{(k)}) + \phi_k \} \cos \{ \omega_0 t + c_n^{(i)}90° \left( \frac{t-nT}{T} \right) + S(n,\underline{C}^{(i)}) \} dt =$$

$$\frac{1}{2} \sum_{n=0}^{N-1} \{ \int_{nT}^{(n+1)T} \cos \{ (c_n^{(k)} - c_n^{(i)})90° \left( \frac{t-nT}{T} \right) +$$

$$S(n,\underline{C}^{(k)}) - S(n,\underline{C}^{(i)}) + \phi_k \} dt + 0 \left( \frac{1}{\omega_0} \right) \} = 0$$

Ignoring the last term and the factor of ½ and using the cosine relationship yields $$a_i^k(1) = \sum_{n=0}^{N-1} \{ \int_{n=0}^{(n+1)T} \cos \{ (c_n^{(k)} - c_n^{(i)})90° \left( \frac{t-nT}{T} \right) + \tag{8}$$

$$S(n,\underline{C}^{(k)}) - S(n,\underline{C}^{(i)}) \} dt \cos\phi_k -$$

$$\int_{nT}^{(n+1)T} \sin \{ (c_n^{(k)} - c_n^{(i)})90° \left( \frac{t-nT}{T} \right) +$$

$$S(n,\underline{C}^{(k)}) - S(n,\underline{C}^{(i)}) \} dt \sin\phi_k \} = 0$$

Since the last equality holds for any $\phi_k$ then (8) leads to two conditions $$\sum_{n=0}^{N-1} \int_{nT}^{(n+1)T} \cos \{ (c_n^{(k)} - c_n^{(i)})90° \left( \frac{t-nT}{T} \right) + \tag{9a}$$

$$S(n,\underline{C}^{(k)}) - S(n,\underline{C}^{(i)}) \} dt = 0$$

$$\sum_{n=0}^{N-1} \int_{nT}^{(n+1)T} \sin \{ (c_n^{(k)} - c_n^{(i)})90° \left( \frac{t-nT}{T} \right) + \tag{9b}$$

$$S(n,\underline{C}^{(k)}) - S(n,\underline{C}^{(i)}) \} dt = 0$$

Condition (9a) by using again a cosine relationship leads to $$\sum_{n=0}^{N-1} \int_{nT}^{(n+1)T} \cos \{ \left( c_n^{(k)}90° \left( \frac{t-nT}{T} \right) + \tag{9c}$$

$$S(n,\underline{C}^{(k)}) \right) \} \cos \{ \left( c_n^{(i)}90° \left( \frac{t-nT}{T} \right) +$$

$$S(n,\underline{C}^{(i)}) \right) \} dt = 0$$

$$\int_{nT}^{(n+1)T} \sin \{ \left( c_n^{(k)}90° \left( \frac{t-nT}{T} \right) +$$

$$S(n,\underline{C}^{(k)}) \right) \} \sin \{ \left( c_n^{(i)}90° \left( \frac{t-nT}{T} \right) +$$

$$S(n,\underline{C}^{(i)}) \right) \} dt = 0$$

The value of each the above integrals can be expressed by the value of cosS (n,C), sinS (n,C), cosS (n+1,C) and sinS (n+1,C) regardless of the value of $c_n$. For example, consider the integral in (9c) for an even time interval from nT to (n+1)T, with n being even, and S(n,C(k))=0 or 180°. The integral can be simplified by using the following expressions, which are apparent from the phase state circle consideration of FIG. 2.

$$\cos \{ c_n^{(k)}90° \left( \frac{t-nT}{T} \right) + S(n,\underline{C}^{(k)}) \} =$$

$$\cos 90° \left( \frac{t-nT}{T} \right) \cos S(n,\underline{C}^{(k)})$$

$$\sin \{ c_n^{(k)}90° \left( \frac{t-nT}{T} \right) + S(n,\underline{C}^{(k)}) \} =$$

$$\sin 90° \left( \frac{t-nT}{T} \right) \sin S(n+1,\underline{C}^{(k)})$$

If $n$ is odd $S(n,\underline{C}^{(k)}) = \pm 90°$ $$\cos \{ c_n^{(k)}90° \left( \frac{t-nT}{T} \right) + S(n,\underline{C}^{(k)}) \} =$$

$$\cos 90° \left( \frac{t-nT}{T} \right) \cos S(n+1,\underline{C}^{(k)})$$

$$\sin \{ c_n^{(k)}90° \left( \frac{t-nT}{T} \right) + S(n,\underline{C}^{(k)}) \} =$$

$$\sin 90° \left( \frac{t-nT}{T} \right) \sin(n,\underline{C}^{(k)})$$

By using these expressions, the integral in (9c) can be calculated and instead of (9c) one has $$\sum_{\substack{n=0 \\ n \text{ even}}}^{N-1} \{\beta \cos S(n,\underline{C}^{(k)})\cos S(n,\underline{C}^{(i)}) + \tag{10a}$$

$$\beta \sin S(n+1,\underline{C}^{(k)})\sin S(n+1,\underline{C}^{(i)})\} +$$

$$\sum_{\substack{n=0 \\ n \text{ odd}}}^{N-1} \{\beta \cos S(n+1,\underline{C}^{(k)})\cos S(n+1,\underline{C}^{(i)}) +$$

$$\beta \sin S(n,\underline{C}^{(k)})\sin S(n,\underline{C}^{(i)})\} = 0$$

where $$\beta = \int_0^T \cos^2 90° \, (t/T) dt = (T/2)$$

is the constant value and here and everywhere cosS (n, $\underline{C}$) ≡ cos (0,C)=1 sins (n,$\underline{C}$) ≡ sin (0,C)=0 Analogously, the condition (9b) leads to $$\sum_{\substack{n=0 \\ n \text{ even}}}^{N-1} \{\gamma \cos S(n,\underline{C}^{(i)})\sin S(n+1,\underline{C}^{(k)}) - \tag{10b}$$

$$\gamma \cos S(n,\underline{C}^{(k)})\sin S(n+1,\underline{C}^{(i)})\} +$$

$$\sum_{\substack{n=0 \\ n \text{ odd}}}^{N-1} \{\gamma \cos S(n+1,\underline{C}^{(i)})\sin S(n,\underline{C}^{(k)}) -$$

$$\gamma \sin S(n,\underline{C}^{(i)})\cos S(n+1,\underline{C}^{(k)})\} = 0$$

where $$\gamma = \int_0^T \cos 90° \, (t/T)\sin 90° \, (t/T) dt = \frac{t}{\pi}$$

is the constant value.

Condition $b_i^{(k)}(1)=0$ leads to the similar (10a),(10b) conditions, but condition $a_i^{(k)}(-1)=0$ leads to two new conditions $$\sum_{\substack{n=0 \\ n \text{ even}}}^{N-1} \{\cos S(n,\underline{C}^{(k)})\cos S(n,\underline{C}^{(i)}) - \quad (10c)$$

$$\sin S(n+1,\underline{C}^{(k)})\sin S(n+1,\underline{C}^{(i)})\} +$$

$$\sum_{\substack{n=0 \\ n \text{ odd}}}^{N-1} \{\cos S(n+1,\underline{C}^{(k)})\cos S(n+1,\underline{C}^{(i)}) -$$

$$\sin S(n,\underline{C}^{(k)})\sin S(n,\underline{C}^{(i)})\} = 0$$

$$\sum_{\substack{n=0 \\ n \text{ even}}}^{N-1} \{\cos S(n,\underline{C}^{(i)})\sin S(n+1,\underline{C}^{(k)}) + \quad (10d)$$

$$\sin S(n,\underline{C}^{(k)})\sin S(n,\underline{C}^{(i)})\} = 0$$

$$\sum_{\substack{n=0 \\ n \text{ odd}}}^{N-1} \{\cos S(n+1,\underline{C}^{(i)})\sin S(n,\underline{C}^{(k)}) +$$

$$\sin S(n,\underline{C}^{(i)})\cos S(n+1,\underline{C}^{(k)})\} = 0$$

For deriving (10c) and (10d), use the relationships $$\cos S(n,-\underline{C}) = \cos S(n,\underline{C})$$

$$\sin S(n,-\underline{C}) = -\sin S(n,\underline{C})$$

The first two conditions (10a), (10b) are the conditions of orthogonality of two arbitrary spread-spectrum MSK signals $x(t,\underline{C}^{(i)})$ and $x(t,\underline{C}^{(k)})$. In particular, the signals of single user $x(t,\underline{C}^{(i)})$ and $x(t,-\underline{C}^{(i)})$ are orthogonal if and only if $$\sum_{n=0}^{N-1} \cos S(n,\underline{C}^{(i)})\sin S(n+1,\underline{C}^{(i)}) + \quad (11)$$

$$\cos S(n+1,\underline{C}^{(i)})\sin S(n,\underline{C}^{(i)}) = 0$$

The condition (10) can be satisfied if and only if $\underline{C}^{(i)}$ and $\underline{C}^{(k)}$ are chosen with the following properties $$\sum_{n=0}^{N-1} \cos S(n,\underline{C}^{(i)})\sin S(n+1,\underline{C}^{(k)}) + \quad (12a)$$

$$\sum_{n=0}^{N-1} \cos S(n+1,\underline{C}^{(i)})\sin S(n,\underline{C}^{(i)}) = 0$$

$$\sum_{n=0}^{N-1} \sin S(n+1,\underline{C}^{(i)})\cos S(n,\underline{C}^{(k)}) + \quad (12b)$$

$$\sum_{n=0}^{N-1} \sin S(n,\underline{C}^{(i)})\cos S(n+1,\underline{C}^{(k)}) = 0$$

$$\sum_{n=0}^{N-1} \cos S(n,\underline{C}^{(i)})\cos S(n,\underline{C}^{(k)}) = 0 \quad (12c)$$

$$\sum_{n=0}^{N-1} \sin S(n,\underline{C}^{(i)})\sin S(n,\underline{C}^{(k)}) = 0 \quad (12d)$$

or equivalently (12a), (12b), (12c), and (12d) can be written as $$\sum_{n=0}^{N-1} \cos_{doub} S(n,\underline{C}^{(i)})\sin_{doub} S(n,\underline{C}^{(k)}) = 0 \quad (12e)$$

$$\sum_{n=0}^{N-1} \sin_{doub} S(n,\underline{C}^{(i)})\cos_{doub} S(n,\underline{C}^{(k)}) = 0 \quad (12f)$$

$$\sum_{n=0}^{N-1} \cos_{doub} S(n,\underline{C}^{(i)})\cos_{doub} S(n,\underline{C}^{(k)}) = 0 \quad (12g)$$

$$\sum_{n=0}^{N-1} \sin_{doub} S(n,\underline{C}^{(i)})\sin_{doub} S(n,\underline{C}^{(k)}) = 0 \quad (12h)$$

respectively.

The terms $\cos_{doub} S(n,\underline{C})$ and $\sin_{doub} S(n,\underline{C})$ mean that in the $\cos S(n,\underline{C})$ and $\sin S(n,\underline{C})$ the zero components are replaced by their following one's.

For example, $$\cos S(n,C) = 1\ 0\ -1\ 0\ -1\ 0\ 1\ 0\ 1\ 0\ -1\ 0$$
$$\cos_{doub} S(n,\underline{C}) = 1\ -1\ -1\ -1\ -1\ 1\ 1\ 1\ 1\ -1\ -1\ 1\ 1$$
$$\sin S(n,\underline{C}) = 0\ -1\ 0\ 1\ 0\ 1\ 0\ -1\ 0\ 1\ 0\ -1$$
$$\sin_{doub} S(n,\underline{C}) = -1\ -1\ 1\ 1\ 1\ 1\ -1\ -1\ 1\ 1\ -1\ -1$$

For the optimal non-coherent MSK spread-spectrum receiver defined by (3), (4), and (5), the sufficient and necessary zero interuser interference condition on used codewords is given by (12a), (12b), (12c), and (12d) or equivalently by (12e), (12f), (12g), and (12h).

Suboptimal spread-spectrum MSK non-coherent receiver structure for special type of codewords, i.e., orthogonal signals, will now be discussed. The goal is to represent a suboptimal MSK non-coherent receiver which has a simple structure and evaluate the possibilities of the suggested receiver in S-CDMA. Assume that the receiver calculates the following values:

$$a'(d) = \sum_{n=0}^{N+1} \int_{nT}^{(n+1)T} y(t)\cos\left(\omega_o t + \frac{S(n,d\underline{C}) + S(n+1,d\underline{C})}{2}\right) dt \quad (13a)$$

$$b'(d) = \sum_{n=0}^{N-1} \int_{nT}^{(n+1)T} y(t)\sin\left(\omega_o t + \frac{S(n,d\underline{C}) + S(n+1,d\underline{C})}{2}\right) dt \quad (13b)$$

Let's allow the transmitter to use only such codewords $\underline{C}^{(i)}$ for which $$\sum_{n=0}^{N-1} \cos S(n,\underline{C}^{(i)})\sin S(n+1,\underline{C}^{(i)}) = 0$$

Figure 3:
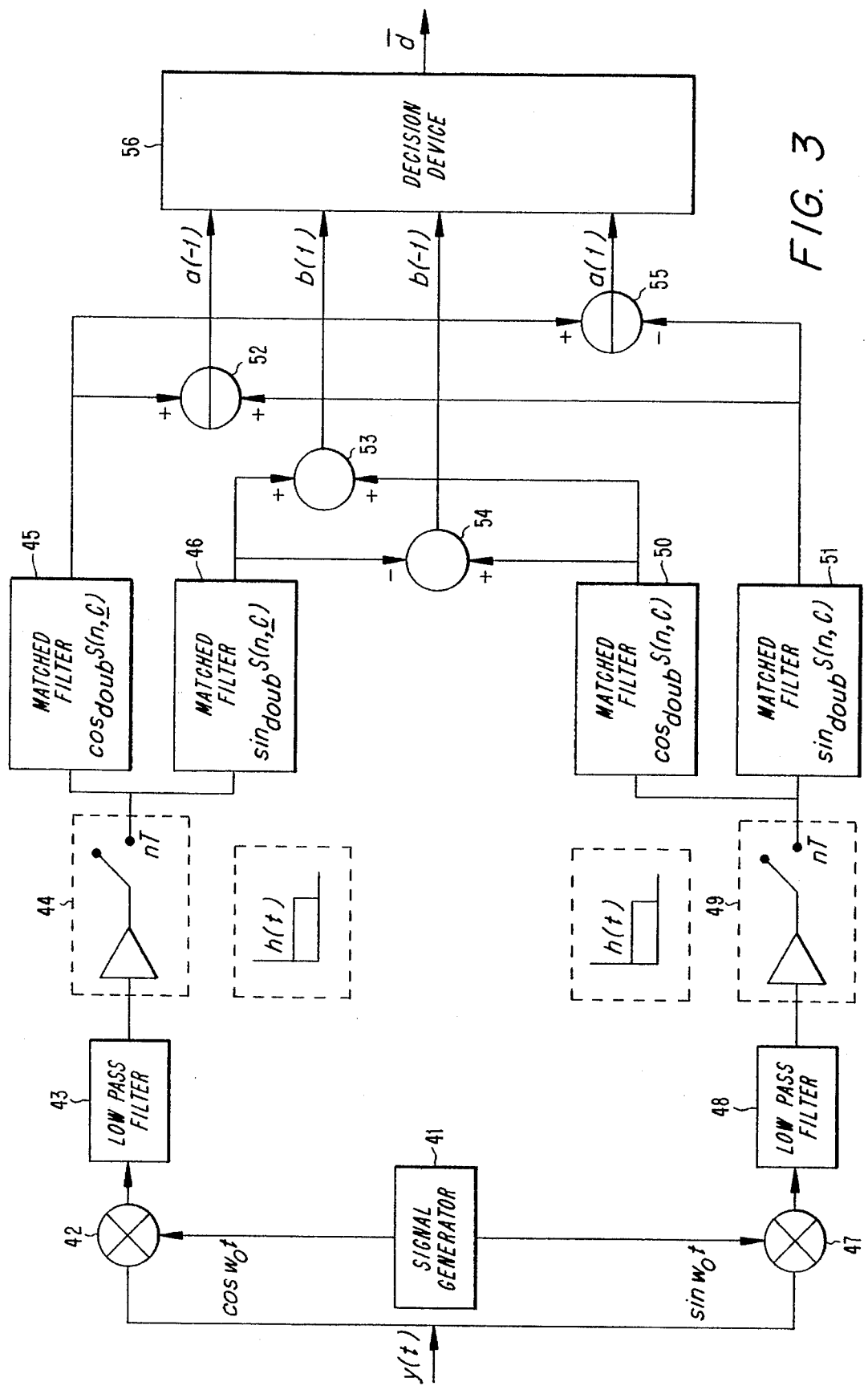
FIG. 3 is a block diagram of an MSK noncoherent average chip phase receiver.

This receiver, which is called the Average Chip Phase (ACP) receiver, allows the simple structure implementation of FIG. 3. For every $n^{th}$ chip time, the information containing phase $p(t,\underline{C}(i))$, see (2) and (2a), varies linearly on time from $S(n,\underline{C})$ to $S(n+1,\underline{C})$. The optimal receiver correlates the received signal with the signal having a phase which varies linearly in the same manner from $S(n,\underline{C})$ to $S(n+1,\underline{C})$, see (3). The suboptimal ACP receiver correlates the received signal with the signal having a phase which is equal to the average value of the information carrying phase for every $n^{th}$ chip time, namely to $(S(n,\underline{C})+S(n+1,\underline{C}))/2$, see (13). This ACP receiver can be implemented as in FIG. 3.

$$a(1) =$$

$$\sum_{n=0}^{N-1} \int_{nT}^{(n+1)T} y(t)\cos\left(\omega_o t + \frac{s(n,\underline{C}) + S(n+1,\underline{C})}{2}\right) dt \sum_{n=0}^{N-1}$$

$$\int_{nT}^{(n+1)T} y(t)\cos(\omega_o t) dt \cos \frac{S(n,\underline{C}) + S(n+1,\underline{C})}{2} -$$

$$\sum_{n=0}^{N-1} \int_{nT}^{(n+1)T} y(t)\sin(\omega_o t) dt \sin \frac{S(n,\underline{C}) + S(n+1,\underline{C})}{2}$$

Figure 2:
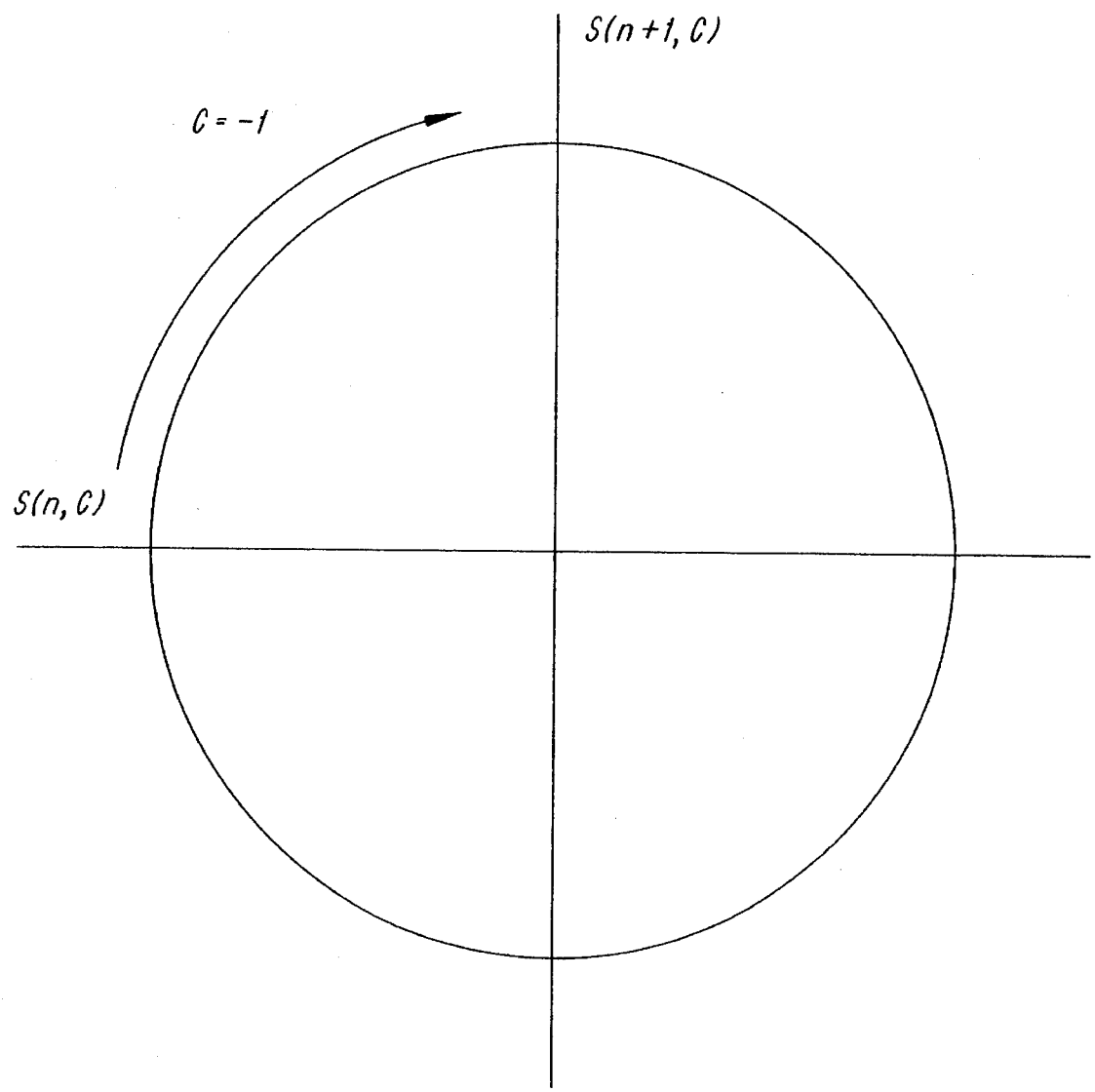
FIG. 2 is a phase state diagram.

Evaluating the value of $$\cos\frac{S(n,\underline{C})+S(n+1,\underline{C})}{2})$$

in the sum for two successive chips n and n+1, letting n be odd, then, referring to the phase state circle of FIG. 2, $$\cos\frac{S(n,\underline{C})+S(n+1,\underline{C})}{2}) = \frac{\sqrt{2}}{2}\cos S(n+1,\underline{C})$$

$$\cos\frac{S(n+1,\underline{C})+S(n+2,\underline{C})}{2}) = -\frac{\sqrt{2}}{2}\cos S(n+1,\underline{C})$$

Thus two successive chips in the matched filter (MF) coincide, therefore a matched content is $\cos_{doub} S(n,\underline{C})$. Finally it follows that (13) can be realized as in FIG. 3.

When the MSK signal x(t), as defined by (1) and (2) and with $-\phi$ instead of $\phi_i$ and ignoring index i, is passed to the input of this receiver then the outputs of the matched filters at the end of the bit interval are:

$$MF_1 (\text{out}) = \quad (14a)$$

$$\delta \sum_{n=0}^{N-1} (\cos_{doub}S(n,d\underline{C})\sin\phi - \sin_{doub}S(n,d\underline{C})\cos\phi)\sin_{doub}S(n,\underline{C})$$

$$MF_2 (\text{out}) = \quad (14b)$$

$$\delta \sum_{n=0}^{N-1} (\cos_{doub}S(n,d\underline{C})\cos\phi + \sin_{doub}S(n,d\underline{C})\sin\phi)\cos_{doub}S(n,\underline{C})$$

$$MF_3 (\text{out}) = \quad (14c)$$

$$\delta \sum_{n=0}^{N-1} (\cos_{doub}S(n,d\underline{C})\sin\phi - \sin_{doub}S(n,d\underline{C})\cos\phi)\sin_{doub}S(n,\underline{C})$$

$$MF_4 (\text{out}) = \quad (14d)$$

$$\delta \sum_{n=0}^{N-1} (\cos_{doub}S(n,d\underline{C})\cos\phi + \sin_{doub}S(n,d\underline{C})\sin\phi)\sin_{doub}S(n,\underline{C})$$

where $$\delta = \frac{A}{2}\int_0^T \cos(90°t/T)dt = A\frac{T}{\pi}$$

and d is a transmitted data bit.

The decision rule for this receiver is the same rule (5) as for the optimal receiver.

Since the best performance for the non-coherent receiver is achieved by using orthogonal signals, the transmitter can be allowed to use only such codewords $\underline{C}^{(i)}$ for which $x(t, \underline{C}^{(i)})$ and $x(t,-\underline{C}^{(i)})$ are orthogonal, i.e., for which the condition (11) holds $$\sum_{n=0}^{N-1} \{\cos S(n,\underline{C}^i)\sin S(n+1,\underline{C}^{(i)}) + \cos S(n+1,\underline{C}^i)\sin S(n,\underline{C}^{(i)})\} = 0 \quad (15a)$$

or equivalently $$\sum_{n=0}^{N-1} \cos_{doub}S(n,\underline{C}^{(i)})\sin_{doub}S(n,\underline{C}^{(i)}) = 0 \quad (15b)$$

The limitation (15) on the used signal with this receiver provides zero for $$\sqrt{a^2(-1)+b^2(-1)}$$

while $$\sqrt{a^2(1)+b^2(1)}$$

are maximal and vice versa, for the noiseless case. If codeword $\underline{C}^{(i)}$ satisfied the limitation (15) then $$a(1) = MF_2(\text{out}) - MF_3(\text{out}) = 2\delta N\cos\phi \quad (16)$$

$$b(1) = MF_1(\text{out}) + MF_4(\text{out}) = 2\delta N\sin\phi$$

$$a(-1) = MF_2(\text{out}) + MF_3(\text{out}) = 0$$

$$b(-1) = MF_1(\text{out}) - MF_4(\text{out}) = 0,$$

where $\delta = A\frac{T}{\pi}$

For transmitted data D=1, see (14).

The ACP receiver can be shown to be suboptimal for orthogonal signals (15) by comparing this receiver with the optimal receiver defined by (3), (4), and (5). If the signal were introduced at the input of the receiver as $y(t)=x(t,d\underline{C})+n(t)$, where n(t) is an AWGN signal, then by comparing (3a) and (3b) with (13a) and (13b) it can be seen that the noise at the outputs of both receivers has the same characteristics, but the MSK modulated signal $x(t,d\underline{C})$ at the input of the ACP receiver has an amplitude $\alpha$ times larger than the MSK modulated signal at the input of the optimal receiver to produce the same signal-to-noise ratio.

Factor $\alpha$ can be found as follows:

$$\alpha = \frac{\int_{nT}^{(n+1)T} \cos\left\{\omega_0 t + c_n 90°\left(\frac{t-nT}{T}\right) + S(n,\underline{C}) + \phi\right\} \cos\{\omega_0 t + c_n 90°(t-nT) + S(n,\underline{C})\}dt}{\int_{nT}^{(n+1)T} \cos\left\{\omega_0 t + c_n 90°\left(\frac{t-nT}{T}\right) + S(n,\underline{C}) + \phi\right\} \cos\left\{\omega_0 t + \frac{S(n,\underline{C})+S(n+1,\underline{C})}{2}\right\} dt} = \quad (17)$$

$$\frac{\frac{T}{2}\cos\phi + 0\left(\frac{1}{\omega_0}\right)}{t\frac{\sqrt{2}}{\pi}\cos\phi + 0\left(\frac{1}{\omega_0}\right)} \approx 1.11$$

which corresponds to 0.9 dB.

The loss of 0.9 dB is obtained for the receiver which employs orthogonal signals (15) because, in this case, if transmitted data d=1 and noise were absent, a(-1)=b(-1)=0 for the ACP receiver, see (16), as well as for the optimal receiver, see (7a). On the other hand, a(1) and b(1) for the ACP receiver are 1.11 times smaller than a (1) and b (1) for the optimal receiver, see (17), if the same signal were at the inputs of both receivers. Because noise behavior on the outputs of both receivers is the same, the ACP receiver provides the same error probability as the optimal receiver if the signal at the input of the ACP receiver had an amplitude 1.11 times larger than the signal at the input of the optimal receiver. Thus loss=20 log 1.11=0.9 dB It is not difficult to check, see (14), where $\cos_{doub}$ S(n,d $\underline{C}$), $\sin_{doub}$ S(n,d$\underline{C}$) should be substituted by $\cos_{doub}$ S(n,d $\underline{C}^{(i)}$), $\sin_{doub}$ S(n, d$\underline{C}^{(i)}$) and $\cos_{doub}$ S(n,$\underline{C}$), $\sin_{doub}$ S(n, $\underline{C}$) by $\cos_{doub}$ S(n,$\underline{C}^{(k)}$), $\sin_{doub}$ S(n,$\underline{C}^{(k)}$) that zero interuser interference conditions for S-CDMA with a non-coherent MSK suboptimal (0.9 dB) receiver coincide with conditions (10) or (12) derived earlier for the optimal receiver.

As shown in FIG. 3, an optimal non-coherent a receiver for demodulating a received-spread-spectrum OQPSK signal y(t), as defined by equations 13 and 5, is shown comprising first generating means, second generating means, first processing means, second processing means, third processing means, fourth processing means, first inverting means, second inverting means, first combining means, second combining means, third combining means, fourth combining means and deciding means. The first processing means is coupled to the first generating means. The second processing means is coupled to the second generating means. The third processing means is coupled to the first generating means. The fourth processing means is coupled to the second generating means. The first inverting means is coupled to the first processing means, and the second inverting means is coupled to the second processing means. The first combining means is coupled to the first processing means and to the fourth processing means. The second combining means is coupled through the first inverting means to the first processing means, and to the fourth processing means. The third combining means is coupled to the second processing means and to the third processing means. The fourth combining means is coupled through the second inverting means to the second processing means, and to the third processing means. The deciding means is coupled to the first combining means, to the second combining means, to the third combining means, and to the fourth combining means.

The first generating means generates an in-phase-component signal from the received-spread-spectrum signal y(t). The second generating means generates a quadrature-phase-component signal from the received-spread-spectrum signal y(t). The first processing means processes the in-phase-component signal using $\sin_{doub}$S(n,C) to generate a first processed signal. The second processing means processes the quadrature-phase-component signal using $\sin_{doub}$S(n,C) to generate a second processed signal. The third processing means processes the in-phase-component signal using $\cos_{doub}$S(n,C) to generate a third processed signal. The fourth processing means processes the quadrature-phase-component signal using $\cos_{doub}$S(n,C) to generate a fourth processed signal. The first inverting means inverts the first processed signal to generate an inverse of the first processed signal. The second inverting means inverts the second processed signal to generate a inverse of the second processed signal.

The first combining means combines the first processed signal with the fourth processed signal to generate a first combined signal. The second combining means combines the inverse of the first processed signal with the fourth processed signal to generate a second combined signal. The third combining means combines the second processed signal with the third processed signal to generate a third combined signal. The fourth combining means combines an inverse of the second processed signal with the third processed signal to generate a fourth combined signal. The deciding means decides or selects an estimate of the data of the received-spread-spectrum signal y(t), from the first processed signal, the second processed signal, the third processed signal or the fourth processed signal.

In the exemplary arrangement shown in FIG. 3, the first generating means is illustrated, by way of example, as signal generator 41, mixer 42, lowpass filter 43, and integrate-and-dump circuit 44. The mixer 42 is coupled between the input, the signal generator 41, and the lowpass filter 43. The integrate-and-dump circuit 44 is coupled to the output of the lowpass filter 43. The first generating means alternatively may be implemented with other types of correlators, a matched filter surface acoustic wave (SAW) device, or equivalent circuitry, is well known in the art.

The second generating means is shown as signal generator 41, mixer 47, lowpass filter 48, and integrate-and-dump circuit 49. The mixer 47 is coupled between the signal generator 41 the lowpass filter 48, and to the input y(t). The integrate-and-dump circuit 49 is coupled to the output of the lowpass filter 48. The second generating means may be implemented with other types of correlators, a matched filter, surface acoustic wave (SAW) device or equivalent circuitry, as is well known the art.

By way of example, the first processing means is illustrated as a first matched filter 46 having impulse function $\sin_{doub}$S(n,C). The first matched filter is coupled to the output of the integrated-and-dump circuit 44. The first processing means alternatively may be implemented using a SAW device, a correlator embodied as a mixer, filter and signal generator, or other circuitry. When using a correlator, the signal generator would generate a signal with $\sin_{doub}$S(n, C).

The second processing means is illustrated as second matched filter 51 having impulse function $\sin_{doub}$S(n,C). The second matched filter 51 is coupled to the output of the integrate-and-pump circuit 49. The second processing means alternatively may be implemented as a SAW device, a correlator embodied as a mixer, signal generator and filter, or other circuitry. When using a correlator, the signal generator would generate a signal with $\sin_{doub}$S(n,C).

The third processing means is illustrated with a third matched filter 45 having impulse function $\cos_{doub}$S(n,C). The third matched filter 45 is coupled to the output of the integrate-and-dump circuit 44. The third processing means alternatively may be implemented as a SAW device, a correlator, embodied as a mixer, filter and signal generator, or other circuitry. When using a correlator, the signal generator would generate a signal with $\cos_{doub}$S(n,C).

The fourth processing means is illustrated by fourth matched filter 50 having impulse function $\cos_{doub}$S(n,C). The fourth matched filter 50 is coupled to the output of the integrate-and-dump circuit 49. The fourth processing means alternatively may be implemented as a SAW device, a correlator, embodied as a mixer, filter and signal generator, or other circuitry. When using a correlator, the signal generator would generate a signal with $\cos_{doub}$S(n,C).

The first inverting means may be an invertor, or merely an inverting input to the second combining means. The second inverting means may be an invertor, or an inverting input to the fourth combining means. The first combining means, the second combining means, the third combining means and the fourth combining means are illustrated in FIG. 3 as first combiner 53, second combiner 54, third combiner 52, and fourth combiner 55. The first inverting means is shown as an inverting input to the second combiner 54. The second inverting means is shown as an inverting input to the fourth combiner 55. The first combiner 53 is coupled to the output of the first matched filter 46 and to the output of the fourth matched filter 50. The second combiner 54 is coupled to the output of the fourth matched filter 50 and has an inverting input or invertor coupled to the output of the first matched filter 46. The third combiner 52 is coupled to the output of the third matched filter 45 and to the output of the second matched filter 51. The fourth combiner 55 is coupled to the output of the third matched filter 45 and has an inverting input or invertor coupled to the output of the second matched filter 51. The outputs of the first combiner 53, the second combiner 54, the third combiner 52, and the fourth combiner 55 are coupled to the decision device 56.

The generator 41 generates a $\cos\omega_o t$ signal and a $\sin\omega_o t$ signal. To obtain the in-phase-component signal, the mixer 42 mixes the received-spread-spectrum signal y(t) with $\cos\omega_o t$, and the lowpass filter 43 filters the output of the mixer 42. The integrate-and-dump circuit 44 samples the output of the lowpass filter 43. At the output of the integrate-and-dump circuit 44 is the in-phase-component signal of the received-spread-spectrum signal y(t).

To obtain the quadrature-phase-component signal, the mixer 47 mixes the received-spread-spectrum signal y(t) with $\sin\omega_o t$, and the lowpass filter 48 filters the output of the mixer 47. The integrate-and-dump circuit 49 samples the output of the lowpass filter 48. At the output of the integrate-and-dump circuit 49 is the quadrature-phase-component signal of the received-spread-spectrum signal y(t).

The frequency $\omega_o$ would be equal to the carrier frequency of the received-spread-spectrum signal y(t) if the subsequent processing or filtering were at baseband. The frequency $\omega_o$ would be different from the carrier frequency of the received-spread-spectrum signal y(t) if the processing or filtering were done at a frequency other than the carrier frequency of the received-spread-spectrum signal y(t), such as an intermediate frequency, if SAW device were used for the first processing means, the second processing means, the third processing means, and the fourth processing means.

The first matched filter 46 processes or filters the in-phase-component signal using impulse function $\sin_{doub}S(n, C)$ to generate the first processed signal. The second matched filter 51 processes or filters the quadrature-phase-component signal using impulse function $\sin_{doub}S(n,C)$ to generate the second processed signal. The third matched filter 45 processes or filters the in-phase-component signal using impulse function $\cos_{doub}S(n,C)$ to generate the third processed signal. The fourth matched filter 50 processes or filters the quadrature-phase-component signal using an impulse function $\cos_{doub}S(n,C)$ to generate the fourth processed signal. The impulse functions $\sin_{doub}S(n,C)$ and $\cos_{doub}S(n,C)$ may be approximated for each matched filter to accomplish the same result.

The first combiner 53 combines the first processed signal with the fourth processed signal to generate the first combined signal. The second combiner 54 combines the inverse of the first processed signal with the fourth processed signal to generate the second combined signal. The third combiner 52 combines the second processed signal with the third processed signal to generate the third combined signal. The fourth combiner 55 combines the inverse of the second processed signal with the third processed signal to generate the fourth combined signal.

The decision device 56 decides or selects the estimate data of the received-spread-spectrum signal y(t) from the first processed signal, the second processed signal, the third processed signal or the fourth processed signal. For the embodiment shown in FIG. 3, a maximum likelihood decision scheme might be used.

As another special case, consider OQPSK. The OQPSK signal can be described by (1), but where $p(t,d\underline{C})$ is defined in another manner then for MSK (2).

$$\text{Let } p(t,d\underline{C}) = \frac{S(n,d\underline{C}) + S(n+1,d\underline{C})}{2} =$$

$$\frac{S(n,d\underline{C}) + S(n,d\underline{C}) + c_n \frac{\pi}{2}}{2} = S(n,d\underline{C}) + dc_n \frac{\pi}{4}$$

where $$S(n,\underline{C}^{(i)}) = 90° \sum_{j=0}^{n-1} c_j^{(i)}$$

Such definition of $p(t,d\underline{C})$ leads to a spread-spectrum OQPSK signal. The optimal receiver structure is (3) (5), where $p(t,d\underline{C})$ is defined above, which coincides with (13). Thus an optimal OQPSK receiver can be implemented as in FIG. 3. The orthogonality conditions remain the same as for MSK signals. The bit error rate curve for orthogonal OQPSK signals coincides with the theoretical curve shown in FIG. 9.

Thus the ACP non-coherent spread-spectrum MSK receiver of FIG. 3 is suboptimal (0.9 dB) and allows S-CDMA operation of FIG. 1 with the zero interuser interference condition if each user employs an MSK spread spectrum modulated signal with codewords $C^{(i)}$, $i=\overline{1,M}$, satisfying the conditions (12) and (15).

There can be several methods for choosing $C^{(i)}$, $i=\overline{1,M}$, with properties (12), (15). For example, as non-zero components of $\cos S$ $(n,\underline{C}^{(i)})$ $i=\overline{1,M}$ the rows of a first half of a Hadamard matrix of Sylvester type can be chosen; as non-zero components of $\sin S$ $(n,\underline{C}^{(i)})$ $i=\overline{1,M}$ the rows of the second half of the Hadamard matrix of Sylvester type can be chosen:

```
CosS(n,C̄⁽¹⁾) = 1  0  1  0  1  0  1  0  1  0  1  0  1  0  1
CosS(n,C̄⁽²⁾) = 1  0 -1  0  1  0 -1  0  1  0 -1  0  1  0 -1  0  1
CosS(n,C̄⁽³⁾) = 1  0  1  0 -1  0 -1  0  1  0  1  0 -1  0 -1  0  1
CosS(n,C̄⁽⁴⁾) = 1  0 -1  0 -1  0  1  0  1  0 -1  0 -1  0  1  0  1
SinS(n,C̄⁽⁴⁾) =    0  1  0  1  0  1  0  1  0 -1  0 -1  0 -1  0 -1
SinS(n,C̄⁽¹⁾) =    0  1  0 -1  0  1  0 -1  0 -1  0  1  0 -1  0  1
SinS(n,C̄⁽³⁾) =    0  1  0  1  0 -1  0 -1  0 -1  0 -1  0  1  0  1
SinS(n,C̄⁽²⁾) =    0  1  0 -1  0 -1  0  1  0 -1  0  1  0  1  0 -1
```

Corresponding codewords are

```
C⁽¹⁾ = 1 -1 -1  1   1 -1 -1   1 -1   1   1 -1 -1  1  1 -1
C⁽²⁾ = 1  1  1  1  -1 -1 -1  -1 -1  -1  -1 -1   1  1  1  1
C⁽³⁾ = 1 -1  1  1   1 -1   1  1 -1   1  -1 -1  -1  1 -1 -1
C⁽⁴⁾ = 1  1 -1  1  -1 -1   1 -1 -1  -1   1 -1   1  1 -1   1
```

The number of users M is equal to N/4, in this case, where N is the length of the codewords.

DIFFERENTIALLY COHERENT SPREAD-SPECTRUM MSK RECEIVER

The performance of a spread-spectrum MSK non-coherent receiver can be improved in the model where on unknown phase of the transmitted signal varies slowly from bit to bit. In this case a differentially coherent receiver, which is based on the ACP receiver structure of FIG. 3 is used with changed decision block as shown in FIG. 4.

Figure 4:
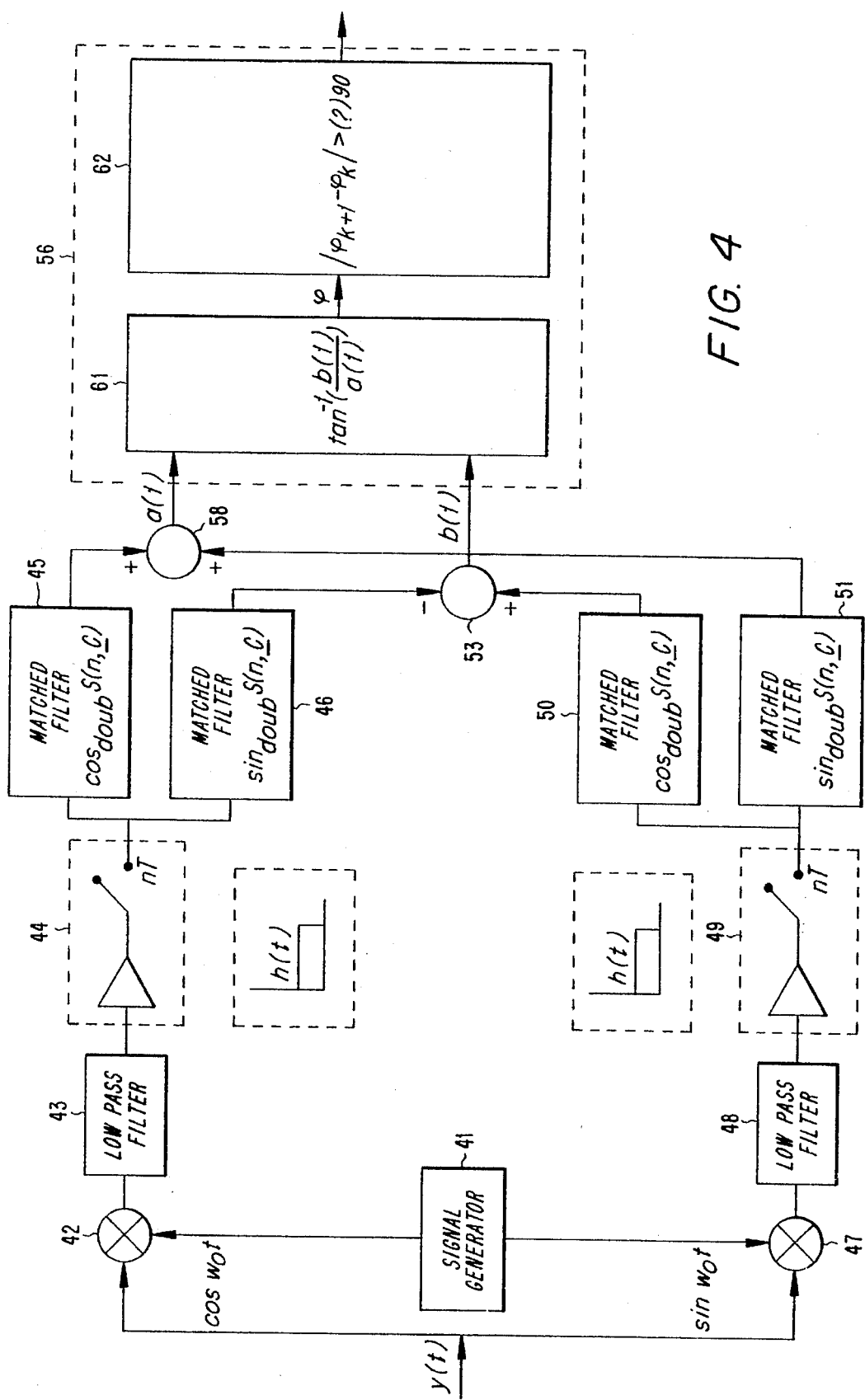
FIG. 4 is a block diagram of a differentially coherent spread-spectrum MSK receiver.

In the exemplary arrangement shown in FIG. 4, a receiver for demodulating a received-spread-spectrum signal y(t) is shown comprising first generating means, second generating means, first processing means, second processing means, third processing means, fourth processing means, inverting means, first combining means, second combining means, and deciding means. The first processing means is coupled to the first generating means. The second processing means is coupled to the second generating means. The third processing means is coupled to the first generating means. The fourth processing means is coupled to the second generating means. The inverting means is coupled to the second processing means.

The first combining means is coupled to the first processing means and to the fourth processing means. The second combining means is coupled through the inverting means to the second processing means and to the fourth processing means. The deciding means is coupled to the first combining means and to the second combining means.

The first generating means generates an in-phase-component signal from the received-spread-spectrum signal y(t). The second generating means generates a quadrature-phase-component signal from the received-spread-spectrum signal y(t). The first processing means processes the in-phase-component signal using $\sin_{doub}S(n,C)$ to generate a first processed signal. The second processing means processes the quadrature-phase-component signal using $\sin_{doub}S(n,C)$ to generate a second processed signal. The third processing means processes the in-phase-component signal using $\cos_{doub}S(n,C)$ to generate a third processed signal. The fourth processing means processes the quadrature-phase-component signal using $\cos_{doub}S(n,C)$ to generate a fourth processed signal. The inverting means inverts the second processing signal to generate a inverse of the second processed signal.

The first combining means combines the second processed signal with the fourth processed signal to generate a first combined signal. The second combining means combines the inverse of the first processed signal with the third processed signal to generate a second combined signal. The deciding means decides or selects from the first processed signal and the second processed signal, an estimate of the data of the received-spread-spectrum signal y(t). The deciding means may determine an angle from an arctangent of the ratio of the first combined signal and second combined signal, and compare the magnitude of the angle to 90°. The estimate of the data is determined from the comparison.

As illustratively shown in FIG. 4, the first generating means is illustrated, by way of example, as signal generator 41, mixer 42, lowpass filter 43, and integrate-and-dump circuit 44. The mixer 42 is coupled between the input, the signal generator 41, and the lowpass filter 43. The integrate-and-dump circuit 44 is coupled to the output of the lowpass filter 43. The first generating means alternatively may be implemented with a matched filter or equivalent circuitry, as is well known in the art.

The second generating means is shown as signal generator 41, mixer 47, lowpass filter 48, and integrate-and-dump circuit 49. The mixer 47 is coupled between the signal generator 41, the lowpass filter 48, and to the input. The integrate-and-dump circuit 49 is coupled to the output of the lowpass filter 48. The second generating means may be implemented with a matched filter, as is well known in the art.

By way of example, the first processing means is illustrated as a first matched filter 46 having impulse function $\sin_{doub}S(n,C)$. The first matched filter is coupled to the output of the integrate-and-dump circuit 44. The first processing means alternatively may be implemented using a SAW device, a correlator embodied as a mixer, filter and signal generator, or other circuitry. The signal generator would generate a signal with $\sin_{doub}S(n,C)$.

The second processing means is illustrated as second matched filter 51 having impulse function $\sin_{doub}S(n,C)$. The second matched filter 51 is coupled to the output of the integrate-and-dump circuit 49. The second processing means alternatively may be implemented as a SAW device, a correlator embodied as a mixer, signal generator and filter, or other circuitry. The signal generator would generate a signal with $\sin_{doub}S(n,C)$.

The third processing means is illustrated with a third matched filter 45 having impulse function $\cos_{doub}S(n,C)$. The third matched filter 45 is coupled to the output of the integrate-and-dump circuit 44. The third processing means alternatively may be implemented as a SAW device, a correlator embodied as a mixer, filter and signal generator, or other circuitry. The signal generator would generate a signal with $\cos_{doub}S(n,C)$.

The fourth processing means is illustrated by fourth matched filter 50 having impulse function $\cos_{doub}S(n,C)$. The fourth matched filter 50 is coupled to the output of the integrate-and-dump circuit 49. The fourth processing means alternatively may be implemented as a SAW device, a correlator, embodied as a mixer, filter and signal generator, or other circuitry. The signal generator would generate a signal with $\cos_{doub}S(n,C)$.

The inverting means may be an invertor, or merely an inverting input to the second combining means. The first combining means and the second combining means are illustrated as first combiner 58 and second combiner 53. The first combiner 58 is coupled to the output of the second matched filter 46 and to the output of the third matched filter 45. The second combiner 53 is coupled to the output of the fourth matched filter 50 and has an inverting input or invertor coupled to the output of the first matched filter 46. The outputs of the first combiner 58 and the second combiner 58, are coupled to the decision device 56.

The generator 41 generates a $\cos\omega_o t$ signal and a $\sin\omega_o t$ signal. To obtain the in-phase-component signal, the mixer 42 mixes the received-spread-spectrum signal y(t) with $\cos\omega_o t$, and the lowpass filter 43 filters the output of the mixer 42. The integrate-and-dump circuit 44 samples the output of the lowpass filter 43. At the output of the integrate-and-dump circuit is the in-phase-component signal of the received-spread-spectrum signal y(t).

To obtain the quadrature-phase-component signal, the mixer 47 mixes the received-spread-spectrum signal y(t) with $\sin\omega_o t$, and the lowpass filter 48 filters the output of the mixer 47. The integrate-and-dump circuit 49 samples the output of the lowpass filter 48. At the output of the integrate-and-dump circuit 49 is the quadrature-phase-component signal of the received-spread-spectrum signal y(t).

The first matched filter 46 processes or filters the in-phase-component signal using impulse function $\sin_{doub}S(n,C)$ to generate the first processed signal. The second matched filter 51 processes or filters the quadrature-phase-component signal using impulse function $\sin_{doub}S(n,C)$ to generate the second processed signal. The third matched filter 45 processes or filters the in-phase-component signal using impulse function $\cos_{doub}S(n,C)$ to generate the third processed signal. The fourth matched filter 50 processes or filters the quadrature-phase-component signal using an impulse function $\cos_{doub}S(n,C)$ to generate the fourth processed signal. The impulse functions $\sin_{doub}S(n,C)$ and $\cos_{doub}S(n,C)$ may be approximated for each matched filter to accomplish the same result.

The first combiner 58 combines the second processed signal with the fourth processed signal to generate the first combined signal. The second combiner 53 combines the inverse of the first processed signal with the fourth processed signal to generate the second combined signal.

The decision device 56 decides or selects the estimate data of the received-spread-spectrum signal y(t) from the first processed signal, and the second processed signal. For the embodiment shown in FIG. 4, an angle is determined from the arctangent 61 of a ratio of the first processed signal and the second processed signal. The magnitude of the angle is compared 62 to determine if the magnitude is greater or less than 90°. The estimate data are selected or determined from this comparison.

In the case of full phase uncertainty the best performance for the spread-spectrum MSK modem was achieved for orthogonal signals. In the case of differentially coherent implementation, the best performance would be expected for antipodal signals as the representation of differentially encoded data bits "0" and "1". To keep the phase continuity uninterrupted at the transition from bit to bit, signals which are "almost" antipodal are used; "almost" antipodal means that the signals used are antipodal in every chip duration excluding the first one and the last one, as shown in the phase tree in FIG. 5.

$$\underline{C}_1 = 1 \ 1{-}1 \ 1 \ 1{-}1{-}1{-}1$$
$$\underline{C}_0 = {-}1 \ 1{-}1 \ 1 \ 1{-}1{-}1 \ 1 \quad (18)$$

Figure 5:
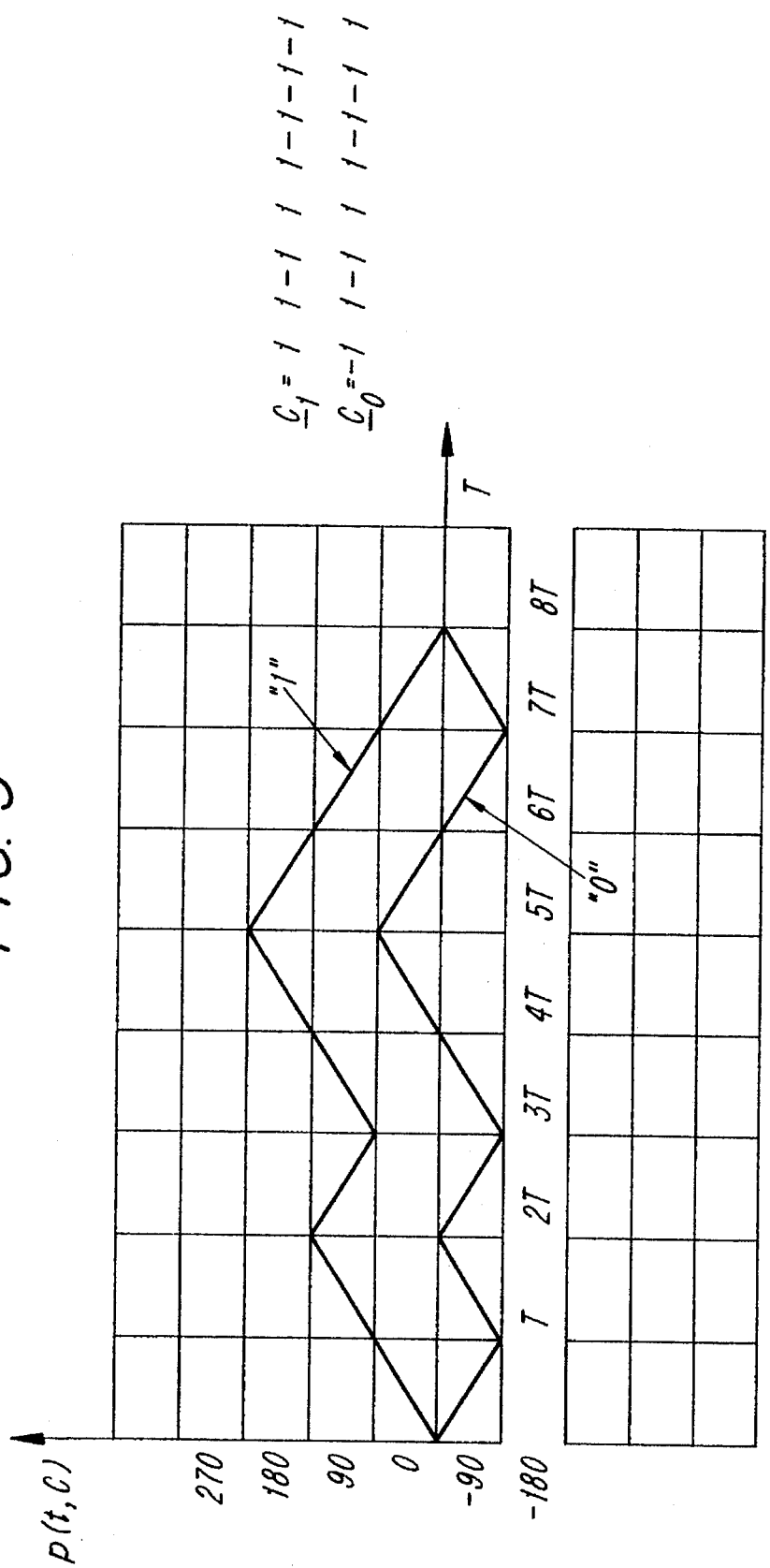
FIG. 5 is a phase tree of spread-spectrum MSK signals.

The phase tree of FIG. 5 shows the phase difference between signals corresponding to differentially encoded data bits "1" and "0" is 180° during every chip time except the first chip time and the last chip time. This can be achieved if the first $C_0$ and the last $C_{N-1}$ chip component of $\underline{C}_1$ and $\underline{C}_0$ are opposite and the remaining components are the same (18). It can be seen also that $$SinS(n,\underline{C}_1) = -SinS(n,\underline{C}_0), \quad n = \overline{0,N-1}$$
$$CosS(n,\underline{C}_1) = -CosS(n,\underline{C}_0), \quad n = \overline{1,N-1} \quad (19)$$
$$CosS(n,\underline{C}_1) = CosS(n,\underline{C}_0), \quad n = 0, n = N$$

The differentially coherent receiver estimates the carrier phase $\phi_k$ after transmission of the $k^{th}$ bit to compare it with estimation of $\phi_{k-1}$ by processing the outputs of a(1), b(1) which are $$a_k(1) = 2\delta N \cos \phi_k \quad (20a)$$
$$b_k(1) = 2\delta N \sin \phi_k$$

if d=1 is transmitted and $$a_k(1) = -2\delta N \cos \phi_k + 4\delta(\cos \phi_k - \sin \phi_k) \quad (20b)$$
$$b_k(1) = -2\delta N \sin \phi_k + 4\delta(\cos \phi_k + \sin \phi_k)$$

if d=0 is transmitted as $k^{th}$ bit, e.g., the noiseless case, where $$\delta = A \frac{T}{\pi} \ ).$$

(see (14) and (16), where $\underline{C}$ and $-\underline{C}$ must be changed by $\underline{C}_1$ and $\underline{C}_0$ for differentially encoded data bits "1" and "0", respectively So, the decision is as follows:
Choose the data bit $d_i$ to be "0" if and only if $|\phi k - \phi k{-}1| < 90°$ and vice versa.

The performance of the differentially coherent spread-spectrum MSK receiver of FIG. 4 with almost antipodal signals was investigated by a simulation model in which it was assumed that there was no transmitter carrier phase change from chip to chip within each bit, but at transition from the $k^{th}$ bit to the k+1$^{th}$ bit, this phase $\phi_k$ can change its value from $\phi_k$ to $\phi_{k+1}$ in the manner that $\phi_{k+1}$ takes equally likely values in the phase region $$\{\phi k{-}\Delta; \phi k{+}\Delta\} \text{where } \Delta = 0° \text{ or } 10° \text{ or } 20°, \quad (21)$$

i.e., dealing with a first order Markov process, $\phi_o$ is equally likely to be anywhere between 0° and 360°. The simulation results are presented in a following section.

Signals $x(t,\underline{C}_1)$ and $x(t,\underline{C}_0)$ are not perfectly antipodal because of the first chips and last chips. The effect of the first chips and last chips can be escaped if, in the receiver of FIG. 4, instead of MF1, MF2, MF3, MF4, the shortened matched filters of length N-2 excluding first $\cos_{doub}$ (0,C), $\sin_{doub}$(0, C) and last $\cos_{doub}$ (N,C), $\sin_{doub}$ (N,C) components of the matched filters are used. Then instead of (20a) (20b), one has:

$$a_k(1) = 2\delta(N{-}2) \cos \phi_k$$
$$b_k(1) = 2\phi(N{-}2) \sin \phi_k,$$

if d=1 is transmitted and $$a_k(1) = -2\delta(N{-}2) \cos \phi_k$$
$$b_k(1) = -2\delta(N{-}2) \sin \phi_k$$

if d=0 were transmitted as the $k^{th}$ bit, e.g., the noiseless case, where $$\delta = A \frac{T}{\pi}$$

In order to simplify the structure of the differentially coherent MSK spread-spectrum receiver of FIG. 4, consider only such codewords $\underline{C}$ for which non-zero components of cosS (n,$\underline{C}$) and sinS (n,$\underline{C}$) coincide. Then $\cos_{doub}S(n,\underline{C})$ and $\sin_{doub}S(n,\underline{C})$ can be written as $$\cos_{doub}S(n,\underline{C}) = 1 a_1 a_1 a_2 a_2 \ldots a_{N-1} a_{N-1} 1 \quad (22)$$
$$\sin_{doub}S(n,\underline{C}) = a_1 a_1 a_2 a_2 a_3 \ldots a_{N-1} 1 1$$

FIGS. 6 and 7 illustrate that the output of the third matched filter 45 which is matched to $\cos_{doub}S(n,\underline{C})$ and this case can be obtained by picking up the output of the first matched filter 46 ($\sin_{doub}S(n,\underline{C})$) at one chip time instance earlier. Some distortion is possible for the first and last chips, but as we have noted above, these two chips can be excluded by using shortened matched filters.

In FIGS. 6 and 7, the mean row of both tables includes the value of samples at the integrator output. The upper row is a content of the first matched filter 46 and the lower row is a content of the third matched filter 46. As shown, the matched filtering procedure in the first matched filter 46 and the third matched filter 45 differs by one chip shift and therefore the realization of a simplified differentially coherent spread-spectrum MSK receiver in the case when $\sin_{doub}S(n,\underline{C})$ and $\cos_{doub} S(n,\underline{C})$ coincide with an accuracy of one chip shift can be implemented as shown in FIG. 8, where D denotes the one chip delay element.

DIFFERENTIALLY COHERENT SPREAD-SPECTRUM SPECIAL CODEWORD MSK RECEIVER

Figure 8:
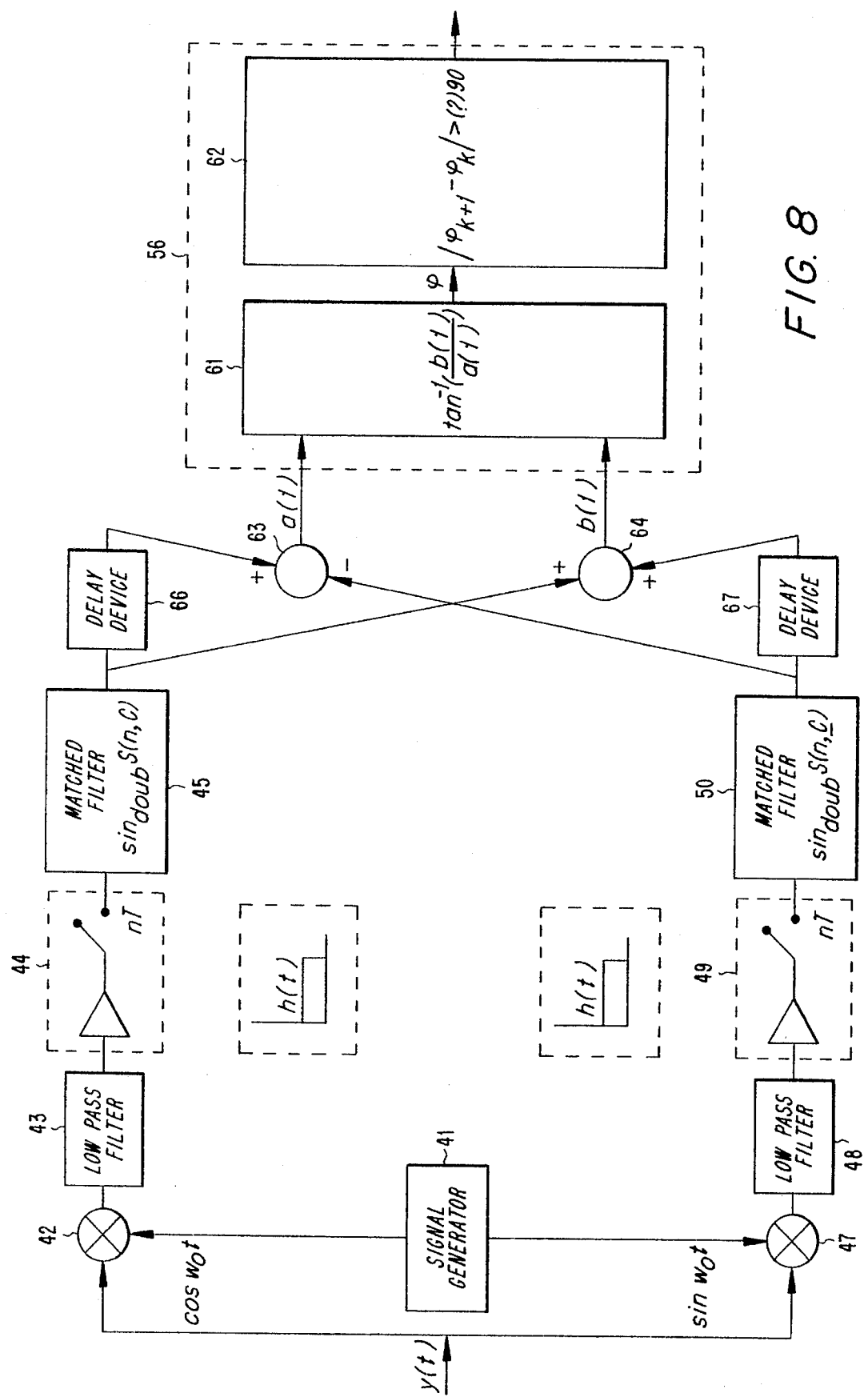
FIG. 8 is a block diagram of a differentially coherent spread-spectrum MSK receiver of special types of codewords.

FIG. 8 shows a differentially coherent spread-spectrum MSK receiver for special type of codewords. If in practice it is necessary to accumulate the value of a(1) and b(1) in any window, then the delay elements can be eliminated. By eliminating the delay elements, the operation of adding and subtracting of MFI and MFII in FIG. 8 can also be eliminated, as corresponding to just rotation on 45°, resulting in derivation of the usual differentially coherent receiver for DBPSK signals. It can be seen that if codeword $\underline{C}$ had the structure (22), then at every even chip time the mean value of the information carrying phase of the MSK signal would be $-\phi+45°$ or $-\phi+45°+180°$, which roughly corresponds to BPSK signals.

As shown in FIG. 8, a differentially coherent spread-spectrum MSK receiver for demodulating a received-spread-spectrum signal y(t) is shown comprising first generating means, second generating means, first processing means, second processing means, first delaying means, second delaying means, inverting means, first combining means, second combining means, and deciding means. The first processing means is coupled to the first generating means. The second processing means is coupled to the second generating means. The first delaying means is coupled to the first processing means. The second delaying means is coupled to the second processing means. The inverting means is coupled to the second processing means. The first combining means is coupled to the first processing means and to the second delaying means. The second combining means is coupled through the inverting means to the second processing means, and to the first delaying means. The deciding means is coupled to the first combining means and to the second combining means.

The first generating means generates an in-phase-component signal from the received-spread-spectrum signal y(t). The second generating means generates a quadrature-phase-component signal from the received-spread-spectrum signal y(t). The first processing means processes the in-phase-component signal using $\sin_{doub}S(n,C)$ to generate a first processed signal. The second processing means processes the quadrature-phase-component signal using $\sin_{doub}S(n,C)$ to generate a second processed signal. The inverting means inverts the second processing signal to generate a inverse of the second processed signal.

The first combining means combines a delayed version of the first processed signal with the inverse of the second processed signal to generate a first combined signal. The second combining means combines the first processed signal with a delayed version of the second processed signal to generate a second combined signal. The deciding means decides or selects an estimate of the data of the received-spread-spectrum signal y(t), from the first processed signal and the second processed signal.

Referring to FIG. 8, the first generating means is illustrated, by way of example, as signal generator 41, mixer 42, lowpass filter 43, and integrate-and-dump circuit 44. The mixer 42 is coupled between the input, the signal generator 41, and the lowpass filter 43. The integrate-and-dump circuit 44 is coupled to the output of the lowpass filter 43. The first generating means alternatively may be implemented with a matched filter or equivalent circuitry, as is well known in the art.

The second generating means is shown as signal generator 41, mixer 47, lowpass filter 48, and integrate-and-dump circuit 49. The mixer 47 is coupled between the signal generator 41, the lowpass filter 48, and to the input. The integrate-and-dump circuit 49 is coupled to the output of the lowpass filter 48. The second generating means may be implemented with a matched filter, or equivalent circuit, as is well known in the art.

By way of example, the first processing means is illustrated as a first matched filter 45 having impulse function $\sin_{doub}S(n,C)$. The first matched filter is coupled to the output of the integrate-and-dump circuit 44. The first processing means alternatively may be implemented using a SAW device, a correlator embodied as a mixer, filter and signal generator, or other circuitry. The signal generator would generate a signal with $\sin_{doub}S(n,C)$, The second processing means is illustrated as second matched filter 50 having impulse function $\sin_{doub}S(n,C)$. The second matched filter 50 is coupled to the output of the integrate-and-dump circuit 49. The second processing means alternatively may be implemented as a SAW device, a correlator, embodied as a mixer, signal generator and filter, or other circuitry. The signal generator would generate a signal with $\sin_{doub}S(n,C)$.

The first delaying means may be a delay device 66 which uses circuitry, or other means to accomplish delay. The second delaying means may be a delay device 67, which uses circuitry or other means to effect delay.

The inverting means may be an invertor, or merely an inverting input to the second combining means. The first combining means, and the second combining means are illustrated as first combiner 63 and second combiner 64. The first combiner 63 is coupled through the delay device 66 to the output of the first matched filter 45, and has an inverting input or invertor coupled to the output of the second matched filter 50. The second combiner 64 is coupled through the second delay device 67 to the output of the second matched filter 50 and to the output of the first matched filter 45. The outputs of the first combiner 63 and the second combiner 64 are coupled to the decision device 56.

The generator 41 generates a $\cos\omega_o t$ signal and a $\sin\omega_o t$ signal. To obtain the in-phase-component signal, the mixer 42 mixes the received-spread-spectrum signal y(t) with $\cos\omega_o t$, and the lowpass filter 43 filters the output of the mixer 42. The integrate-and-dump circuit 44 samples the output of the lowpass filter 43. At the output of the integrate-and-dump circuit is the in-phase-component signal of the received-spread-spectrum signal y(t).

To obtain the quadrature-phase-component signal, the mixer 47 mixes the received-spread-spectrum signal y(t) with $\sin\omega_o t$, and the lowpass filter 48 filters the output of the mixer 47. The integrate-and-dump circuit 49 samples the output of the lowpass filter 48. At the output of the integrate-and-dump circuit 49 is the quadrature-phase-component signal of the received-spread-spectrum signal y(t).

The first matched filter 46 processes or filters the in-phase-component signal using impulse function $\sin_{doub}S(n, C)$ to generate the first processed signal. The second matched filter 51 processes or filters the quadrature-phase-component signal using impulse function $\sin_{doub}S(n,C)$ to generate the second processed signal. The impulse function $\sin_{doub}S(n,C)$ may be approximated for each matched filter to accomplish the same result.

The first combiner 63 combines a delayed version of the first processed signal with the inverse of the second processed signal to generate the first combined signal. The second combiner 64 combines a delayed version of the second processed signal with the first processed signal to generate the second combined signal.

The decision device 56 decides or selects the estimate data of the received-spread-spectrum signal y(t) from the first processed signal and the second processed signal. For the embodiment shown in FIG. 8, an angle is determined from the arctangent 61 of a ratio of the first processed signal to the second processed signal. The magnitude of the angle is compared 62 to determine if the magnitude is greater or less than 90°. The estimate data are selected or determined from this comparison.

In S-CDMA in which the differentially coherent spread-spectrum MSK modem system signals assigned to each user are not perfectly antipodal, CDMA operation with zero interuser interference is virtually impossible, but interference noise can be reduced to a sufficiently insignificant level small in comparison with intended signal energy so that zero interuser interference $a_i^{(k)}(1)=0$, $b_i^{(k)}(1)=0$ (see $7a$, $7b$ only with d=1) can be derived for a differentially coherent receiver with shortened matched filter by excluding the first and the last chips of the matched filter. The minimum interuser interference conditions, with usual matched filters, or the zero interuser interference conditions, with a shortened matched filter, can be written as follows (see (10a) (10b) or (14)):

$$\sum_{n=0}^{N-1} \cos_{doub} S(n,\underline{C}^{(i)}) \cos_{doub} S(n,\underline{C}^{(k)}) + \quad (23a)$$

$$\sum_{n=0}^{N-1} \sin_{doub} S(n,\underline{C}^{(i)}) \sin_{doub} S(n,\underline{C}^{(k)}) = 0$$

$$\sum_{n=0}^{N-1} \sin_{doub} S(n,\underline{C}^{(i)}) \cos_{doub} S(n,\underline{C}^{(k)}) - \quad (23b)$$

$$\sum_{n=0}^{N-1} \cos_{doub} S(n,\underline{C}^{(i)}) \sin_{doub} S(n,\underline{C}^{(k)}) = 0$$

Recall that in an S-CDMA system with a non-coherent spread-spectrum MSK modem, each user was assigned orthogonal signals for data "1" and "0". In an S-CDMA system with a differentially coherent spread-spectrum MSK modem, these two orthogonal signals can be assigned to two different users. Therefore the number of orthogonal users can be doubled. The non-coherent receiver in FIG. 3 can serve two users, each of whom are employing almost antipodal signals $\underline{C}_1^{(i)}$, $\underline{C}_2^{(i)}$ and $\underline{C}_1^{(j)}$, $\underline{C}_2^{(j)}$ for which $\cos S(n, \underline{C}_1^{(i)})=\cos S(n, \underline{C}^{(j)})$ $\sin S(n, \underline{C}^{(i)})=-\sin S(n, \underline{C}_1^{(j)})$. In this case data detection of one user can be implemented by using $a(1)$ $b(1)$ outputs and the data detection of the second user can be implemented by using $a(-1)$ $b(-1)$ outputs of the receiver shown in FIG. 3 to calculate the phase $\phi$ value.

If the users employ codewords with properties (22) and a corresponding differentially coherent receiver has the structure shown in FIG. 8, then the minimum interuser interference conditions are (see (23a), (23b) with (22)):

$$\sum_{n=0}^{N-1} \cos S(n,\underline{C}^{(i)})\cos S(n,\underline{C}^{(k)}) = 0 \quad (24a)$$

$$\sum_{n=0}^{N-2} \cos S(n,\underline{C}^{(i)})\cos S(n+2,\underline{C}^{(k)}) = \sum_{n=0}^{N-2} \cos S(n+2,\underline{C}^{(i)})\cos S(n,\underline{C}^{(k)}) \quad (24b)$$

COMPUTER SIMULATION RESULTS NON-COHERENT SPREAD-SPECTRUM MSK ACP RECEIVER

In this section the performance analysis of the non-coherent spread-spectrum MSK receiver and error-rate curves are given. The performance measurement of the MSK receiver under AWGN was implemented by computer simulation using Monte-Carlo techniques. To simulate the effect of channel noise, the independent identically distributed Gaussian variables with zero mean and variance VAR were added to noise-free integrator or lowpass filter LPF outputs at sampling instance in in-phase and quadrature arms, see FIG. 3. At the receiver front-end the data bit "0" is represented by spread-spectrum MSK signal $x(t,\underline{C})$ and the data bit "1" is represented by $x(t,-\underline{C})$ (1), where 64-chip codeword $\underline{C}$, to provide the orthogonality of $x(t,C)$ and $x(t,-C)$, was chosen in accordance with limitation (15):

$$\sum_{n=0}^{N-1} \{\cos S(n,\underline{C}^i)\sin S(n+1,\underline{C}^{(i)}) + \cos S(n+1,\underline{C}^i)\sin S(n,\underline{C}^{(i)})\} = 0$$

When the samples were taken after the integrator to transfer the BER vs. VAR to BER vs. $E_b/N_o$, the following relationships were used:

$$E_b = \int_0^{Tb} x^2(t,\underline{C})dt = N\frac{T}{2} A^2$$

where T is a chip duration, A is the amplitude of the MSK signal and N is the number of chips.

$$VAR = E\left\{ \int_{(n-1)}^{nT}\int_{(n-1)T}^{nT} n(t)n(\tau)\cos\omega_o t \cos\omega_o \tau dt d\tau \right\} = \frac{N_o T}{4}$$

where E{.} denotes math expectation and $N_o$ is the one-sided spectral density of white noise.

From these relationships it follows that $E_b/N_o$=80/VAR, because in the simulation N=64, T=π/2, A=2. When samples were taken after the low pass filter and without an integrator, then the $E_b/N_o$=NWT/VAR, where W is an equivalent noise bandwidth of the low pass filter. The low pass filter was not simulated, ignoring its effect on the baseband noise-free signal, but it was assumed that because of the good spectral properties of the MSK signal, the approximation W=1.25/T is valid for two samples per chip time, and W=2/T for four samples per chip time. As a result of computer simulation, the following performance curves are plotted in FIG. 9.

Figure 9:
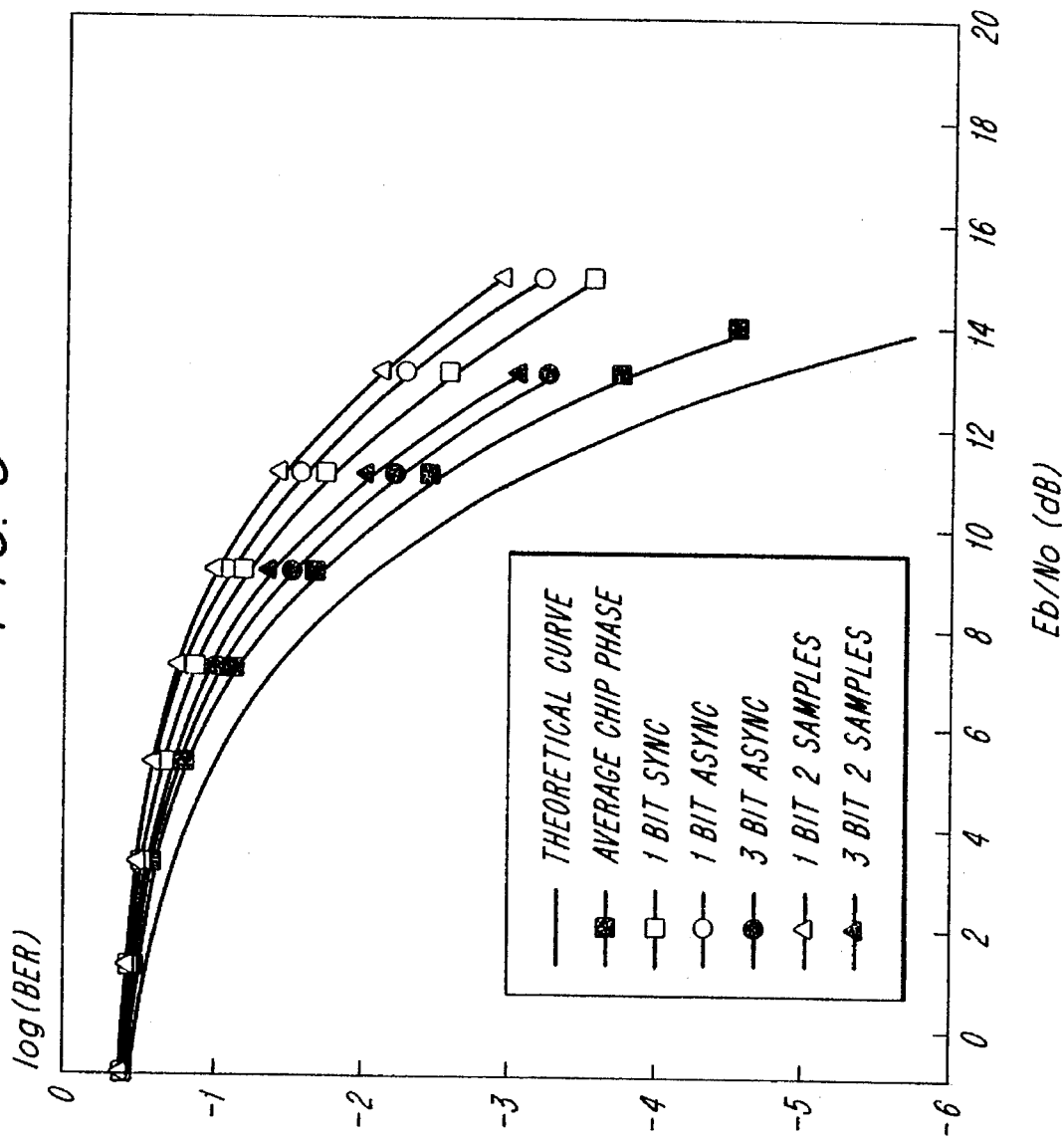
FIG. 9 illustrates error rate curves for an average chip phase receiver.

As used in FIG. 9, "theoretical curve" illustrates the performance of the optimum non-coherent receiver (BER= 0.5exp (−0.5Eb/No). The "ACP" curve illustrates the performance of the ACP receiver. As seen, there is a degradation of about 1 dB compared to the optimum receiver. Synchronous 3-bit and 8-bit samples with AGC, give practically the same result as the ACP receiver.

The "3 bit async" curve illustrates the performance when 3-bit samples of integrator output were taken asynchronously within T/2. There is degradation of about 0.8 dB compared to the ACP receiver.

The "3 bit 2 samples" curve illustrates the performance of the receiver with asynchronous 3-bit samples sampled two times during the chip time just after the low pass filter. There is degradation of about 1 dB compared to the ACP receiver.

The "1 bit sync" curve illustrates the performance when 1-bit samples of integrator output are taken synchronously at the end of every chip time. There is degradation about 2 dB compared to the ACP receiver. The "1 bit async" curve illustrates the performance when 1-bit samples of integrator output are taken asynchronously within T/2. There is degradation of about 3 dB compared to the ACP receiver.

The "1 bit 2 samples" curve illustrates the performance of the receiver with asynchronous 1-bit samples sampled two times during the chip time just after the low pass filter. There is degradation of about 3.5 dB compared to the ACP receiver.

DIFFERENTIALLY COHERENT SPREAD-SPECTRUM MSK ACP RECEIVER

Performance measurement of the differentially coherent MSK receiver, shown in FIG. 4, under AWGN was implemented by computer simulation, in the same manner as was the non-coherent MSK receiver. As the data bit representation, the antipodal spread-spectrum MSK signal has been used ((19),N=64). As a result of computer simulation, the following curves are plotted in FIG. 10.

Figure 10:
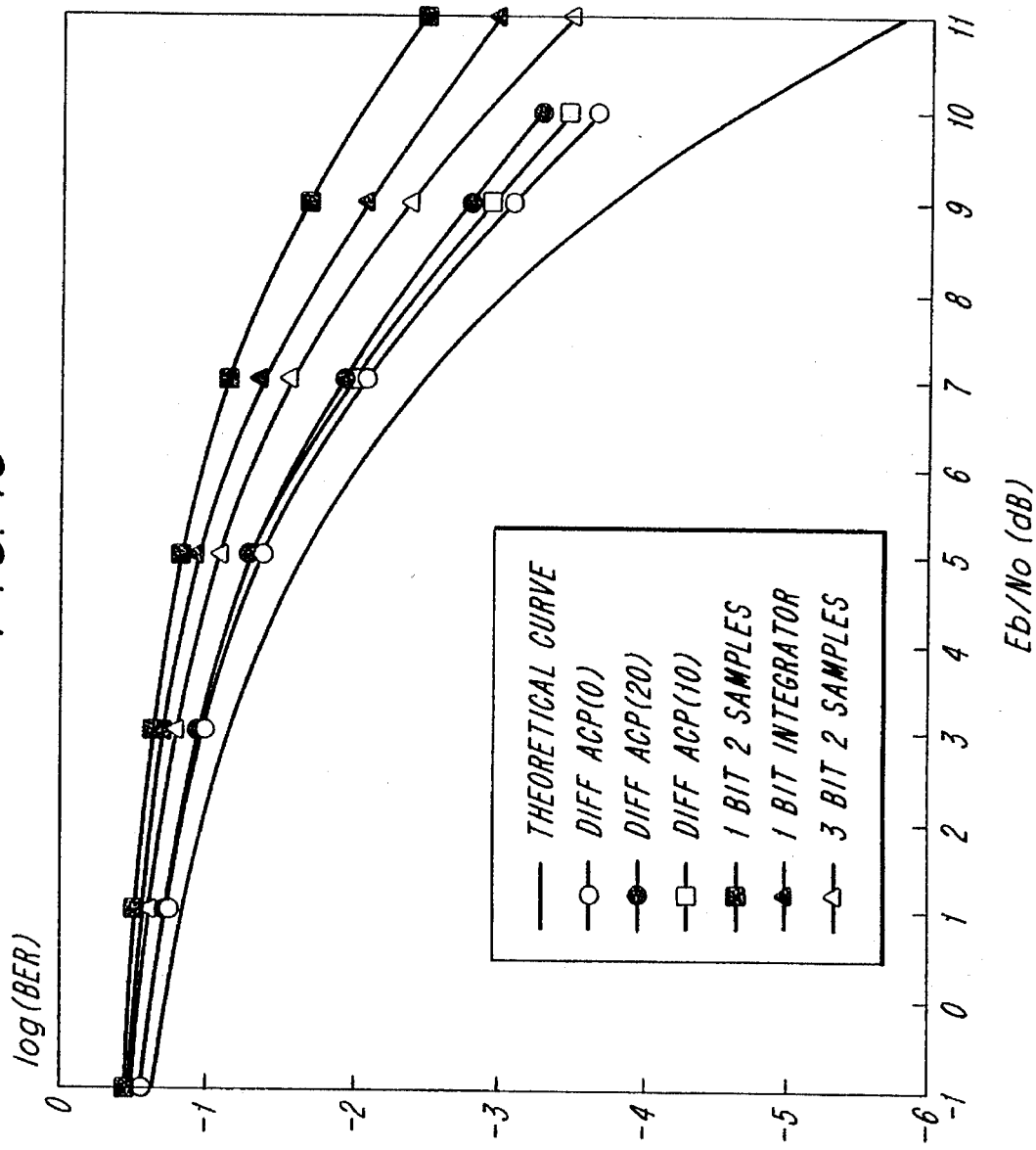
FIG. 10 illustrates error rate curves for a differentially coherent spread-spectrum MSK receiver.

As used in FIG. 10, "theoretical curve" illustrates the performance of differentially coherent PSK signals (BER= 0.5 exp($-E_b/N_o$). The "Diff ACP(0)" curve illustrates the performance of the differentially coherent receiver when relative phase instability from bit to bit $\Delta$=0(see (21)).

The "Diff ACP(10)" curve illustrates the performance of the differentially coherent receiver when relative phase instability from bit to bit $\Delta$=10(see (21)).

The "Diff ACP(20)" curve illustrates the performance of the differentially coherent receiver when relative phase instability from bit to bit $\Delta$=20(see (21)).

The "1 bit 2 samples" curve illustrates the performance of the differentially coherent receiver with asynchronous 1-bit samples sampled two times during the chip time just after the low pass filter.

The "1 bit integrator" curve illustrates the performance when 1-bit samples of integrator output are taken synchronously at the end of every chip time.

The "3 bit 2 samples" curve illustrates the performance of the differentially coherent receiver with asynchronous 3-bit samples sampled two times during the chip time just after the low pass filter.

The "1 bit 4 samples" curve illustrates the performance of the differentially coherent receiver with asynchronous 1-bit samples sampled four times during the chip time just after the low pass filter coinciding with the "1 bit integrator" curve. It should be noted that synchronous 3-bit samples with AGC give practically the same result as "Diff ACP(0)", "Diff ACP(10)","Diff ACP(20)" correspondingly. Note also that integrator output sampled asynchronously leads to about 1 dB loss. Comparing the curves plotted in FIG. 10 coherent with the curves plotted in FIG. 9 shows that the differentially spread-spectrum MSK receiver has an energetic gain of 2.5–2.8 dB compared with the non-coherent spread-spectrum MSK ACP receiver shown in FIG. 4.

It will be apparent to those skilled in the art that various modifications can be made to the MSK spread-spectrum receiver of the instant invention without departing from the scope or spirit of the invention, and it is intended that the present invention cover modifications and variations of the MSK spread-spectrum receiver provided they come within the scope of the appended claims and their equivalents.

We claim:

1. A method for demodulating a received-spread-spectrum signal using a minimum-shift-keyed (MSK) receiver, comprising the steps of:

generating an in-phase-component signal from the received-spread-spectrum signal;

generating a quadrature-phase-component signal from the received-spread-spectrum signal;

processing the in-phase-component signal using $\sin_{doub}$-S(n,C) to generate a first processed signal;

processing the quadrature-phase-component signal using $\sin_{doub}$S(n,C) to generate a second processed signal;

processing the in-phase-component signal using $\cos_{doub}$-S(n,C) to generate a third processed signal;

processing the quadrature-phase-component signal using $\cos_{doub}$S(n,C) to generate a fourth processed signal;

combining the first processed signal with the fourth processed signal to generate a first combined signal;

combining an inverse of the first processed signal with the fourth processed signal to generate a second combined signal;

combining the second processed signal with the third processed signal to generate a third combined signal;

combining an inverse of the second processed signal with the third processed signal to generate a fourth combined signal; and deciding from the first combined signal, the second combined signal, the third combined signal and the fourth combined signal, an estimate of data of the received-spread-spectrum signal.

2. A method for demodulating a received-spread-spectrum signal using a minimum-shift-keyed (MSK) receiver, comprising the steps of:

generating an in-phase-component signal from the received-spread-spectrum signal;

generating a quadrature-phase-component signal from the received-spread-spectrum signal;

processing the in-phase-component signal using $\sin_{doub}$-S(n,C) to generate a first processed signal;

processing the quadrature-phase-component signal using $\sin_{doub}$S(n,C) to generate a second processed signal;

processing the in-phase-component signal using $\cos_{doub}$-S(n,C) to generate a third processed signal;

processing the quadrature-phase-component signal using $\cos_{doub}$S(n,C) to generate a fourth processed signal;

combining the first processed signal with the fourth processed signal to generate a first combined signal;

combining an inverse of the second processed signal with the third processed signal to generate a second combined signal;

determining an angle from the first combined signal and the second combined signal; and deciding from the angle an estimate of data from the received-spread-spectrum signal.

3. The method as set forth in claim 1, or 2, wherein:

the step of processing the in-phase-component signal using $\cos_{doub}$S(n,C) includes the step of filtering the in-phase-component signal using an impulse function matched to $\cos_{doub}$S(n,C);

the step of processing the in-phase-component signal using $\sin_{doub}$S(n,C) includes the step of filtering the in-phase-component signal using an impulse function matched to $\sin_{doub}$S(n,C);

the step of processing the quadrature-phase-component signal using $\cos_{doub}$S(n,C) includes the step of filtering the quadrature-phase-component signal using an impulse function matched to $\cos_{doub}$S(n,C); and the step of processing the quadrature-phase-component signal using $\sin_{doub}$S(n,C) includes the step of filtering the quadrature-phase component signal using an impulse function matched to $\sin_{doub}$S(n,C).

4. The method as set forth in claim 3, wherein the step of determining the angle includes the step of generating an angle from an arctangent of the first combined signal and the second combined signal.

5. The method as set forth in claim 1 or 2, wherein:

the step of processing the in-phase-component signal using $\cos_{doub}$S(n, C) includes the step of correlating the in-phase-component signal with a signal having cos$_{doub}$S(n,C);

the step of processing the in-phase-component signal using sin$_{doub}$S(n,C) includes the step of correlating the in-phase-component signal with a signal having sin$_{doub}$S(n,C);

the step of processing the quadrature-phase-component signal using COS$_{doub}$S(n,C) includes the step of correlating the quadrature-phase-component signal with a signal having cos$_{doub}$S(n,C); and the step of processing the quadrature-phase-component signal using sin$_{doub}$S(n, C) includes the step of correlating the quadrature-phase component signal with a signal having sin$_{doub}$S(n,C).

6. The method as set forth in claim 5, wherein the step of determining the angle includes the step of generating an angle from an arctangent of the first combined signal and the second combined signal.

7. A method for demodulating a received-spread-spectrum signal using a minimum-shift-keyed (MSK) receiver, comprising the steps of:

generating an in-phase-component signal from the received-spread-spectrum signal;

generating a quadrature-phase-component signal from the received-spread-spectrum signal;

processing the in-phase-component signal using sin$_{doub}$S(n,C) to generate a first processed signal;

delaying the first processed signal to generate a first delayed-processed signal;

processing the quadrature-phase-component signal using sin$_{doub}$S(n,C) to generate a second processed signal;

delaying the second processed signal to generate a second delayed-processed signal;

combining the first processed signal with the second delayed-processed signal to generate a first combined signal;

combining the second processed signal with an inverse of the first delayed-processed signal to generate a second combined signal;

determining an angle from the first combined signal and the second combined signal; and deciding from the angle an estimate of data from the received-spread-spectrum signal.

8. The method as set forth in claim 7, wherein:

the step of processing the in-phase-component signal using sin$_{doub}$S(n,C) includes the step of filtering the in-phase-component signal using an impulse function matched to sin$_{doub}$S(n,C); and the step of processing the quadrature-phase-component signal using sin$_{doub}$S(n,C) includes the step of filtering the quadrature-phase component signal using an impulse function matched to sin$_{doub}$S(n,C).

9. The method as set forth in claim 8, wherein the step of determining the angle includes the step of generating an angle from an arctangent of the first combined signal and the second combined signal.

10. The method as set forth in claim 7, wherein the step of determining the angle includes the step of generating an angle from an arctangent of the first combined signal and the second combined signal.

11. The method as set forth in claim 7, wherein:

the step of processing the in-phase-component signal using sin$_{doub}$S(n,C) includes the step of correlating the in-phase-component signal using an impulse function matched to sin$_{doub}$S(n,C); and the step of processing the quadrature-phase-component signal using sin$_{doub}$S(n,C) includes the step of correlating the quadrature-phase component signal using an impulse function matched to sin$_{doub}$S(n,C).

12. The method as set forth in claim 11, wherein the step of determining the angle includes the step of generating an angle from an arctangent of the first combined signal and the second combined signal.

13. A receiver for demodulating a received-spread-spectrum signal, comprising:

first generating means for generating an in-phase-component signal from the received-spread-spectrum signal;

second generating means for generating a quadrature-phase-component signal from the received-spread-spectrum signal;

first processing means, coupled to said first generating means, for processing the in-phase-component signal using sin$_{doub}$S(n,C) to generate a first processed signal;

second processing means, coupled to said second generating means, for processing the quadrature-phase-component signal using sin$_{doub}$S(n,C) to generate a second processed signal;

third processing means, coupled to said first generating means, for processing the in-phase-component signal using cos$_{doub}$S(n,C) to generate a third processed signal;

fourth processing means, coupled to said second generating means, for processing the quadrature-phase-component signal using cos$_{doub}$S(n,C) to generate a fourth processed signal;

first inverting means coupled to said first processing means for inverting the first processed signal;

second inverting means coupled to said second processing means for inverting the second processed signal;

first combining means, coupled to said first processing means and to said fourth processing means, for combining the first processed signal with the fourth processed signal to generate a first combined signal;

second combining means, coupled through said first inverting means to said first processing means and to said fourth processing means, for combining an inverse of the first processed signal with the fourth processed signal to generate a second combined signal;

third combining means, coupled to said second processing means and to said third processing means, for combining the second processed signal with the third processed signal to generate a third combined signal;

fourth combining means, coupled through said second inverting means to said second processing means and to said third processing means, for combining an inverse of the second processed signal with the third processed signal to generate a fourth combined signal; and deciding means, coupled to said first combining means, to said second combining means, to said third combining means and to said fourth combining means, for deciding from the first processed signal, the second processed signal, the third processed signal and the fourth processed signal, an estimate of data of the received-spread-spectrum signal.

14. A receiver for demodulating a received-spread-spectrum signal, comprising:

first generating means for generating an in-phase-component signal from the received-spread-spectrum signal;

second generating means for generating a quadrature-phase-component signal from the received-spread-spectrum signal;

first processing means, coupled to said first generating means, for processing the in-phase-component signal using $\sin_{doub}S(n,C)$ to generate a first processed signal;

second processing means, coupled to said second generating means, for processing the quadrature-phase-component signal using $\sin_{doub}S(n,C)$ to generate a second processed signal;

third processing means, coupled to said first generating means, for processing the in-phase-component signal using $\cos_{doub}S(n,C)$ to generate a third processed signal;

fourth processing means, coupled to said fourth generating means, for processing the quadrature-phase-component signal using $\cos_{doub}S(n,C)$ to generate a fourth processed signal;

inverting means, coupled to said second processing means, for inverting the second processed signal;

first combining means, coupled to said first processing means and to said fourth processing means, for combining the first processed signal with the fourth processed signal to generate a first combined signal;

second combining means, coupled to said third processing means and through said inverting means to said fourth processing means, for combining the third processed signal with the inverse of the fourth processed signal to generate a second combined signal;

angle means, coupled to said first combining means and to said second combining means, for determining an angle from the first combined signal and the second combined signal; and estimate means, coupled to said angle means, for deciding from the angle an estimate of data from the received-spread-spectrum signal.

15. The receiver as set forth in claim 13 or 14, wherein:

said first processing means includes a first filter for filtering the in-phase-component signal using an impulse function matched to $\cos_{doub}S(n,C)$;

said second processing means includes a second filter for filtering the in-phase-component signal using an impulse function matched to $\sin_{doub}S(n,C)$;

said third processing means includes a third filter for filtering the quadrature-phase-component signal using an impulse function matched to $\cos_{doub}S(n,C)$; and said fourth processing means includes a fourth filter for filtering the quadrature-phase component signal using an impulse function matched to $\sin_{doub}S(n,C)$.

16. The receiver as set forth in claim 13 or 14, wherein:

said first processing means includes a first correlator for correlating the in-phase-component signal with a signal having $\cos_{doub}S(n,C)$;

said second processing means includes a second correlator for correlating the in-phase-component signal with a signal having $\sin_{doub}S(n,C)$;

said third processing means includes a third correlator for correlating the quadrature-phase-component signal with a signal having $\cos_{doub}S(n,C)$; and said fourth processing means includes a fourth correlator for correlating the quadrature-phase component signal with a signal having $\sin_{doub}S(n,C)$.

17. A receiver for demodulating a received-spread-spectrum signal, comprising:

first generating means for generating an in-phase-component signal from the received-spread-spectrum signal;

second generating means for generating a quadrature-phase-component signal from the received-spread-spectrum signal;

first processing means, coupled to said first generating means, for processing the in-phase-component signal using $\sin_{doub}S(n,C)$ to generate a first processed signal;

first delaying means, coupled to said first processing means, for delaying the first processed signal to generate a delayed-first-processed signal;

second processing means, coupled to said second generating means, for processing the quadrature-phase-component signal using $\sin_{doub}S(n,C)$ to generate a second processed signal;

second delaying means, coupled to said second processing means, for delaying the second processed signal to generate a delayed-second-processed signal;

first combining means, coupled to said first processing means and to said second delaying means, for combining the first processed signal with the delayed-second-processed signal to generate a first combined signal;

second combining means, coupled to said second processing means and to said first delaying means, for combining the second processed signal with the delayed-first-processed signal to generate a second combined signal;

angle means, coupled to said first combining means and to said second combining means, for determining an angle from the first combined signal and the second combined signal; and estimate means, coupled to said angle means, for deciding from the angle an estimate of data from the received-spread-spectrum signal.

18. The receiver as set forth in claim 17, wherein:

said first processing means includes a first filter for filtering the in-phase-component signal using an impulse function matched to $\sin_{doub}S(n,C)$; and said second processing means includes a second filter for filtering the quadrature-phase component signal using an impulse function matched to $\sin_{doub}S(n,C)$.

19. The receiver as set forth in claim 17, wherein:

said first processing means includes a first correlator for correlating the in-phase-component signal with a signal having $\sin_{doub}S(n,C)$;

said second processing means includes a second correlator for correlating the quadrature-phase component signal with a signal having $\sin_{doub}S(n,C)$.

* * * * *

UNITED STATES PATENT AND TRADEMARK OFFICE
CERTIFICATE OF CORRECTION

PATENT NO. : 5,592,506
DATED : January 7, 1997
INVENTOR(S) : Jimmy K. Omura, Paul T. Yang, Gurgen H. Khachatrian, Karen M. Nikagossian, Karen S. Hovakimian and Armen L. Vartapetian It is certified that error appears in the above-identified patent and that said Letters Patent is hereby corrected as shown below: Title page, item [75]:

<u>In the Inventors</u>:

Delete each appearence of "Argentina" and insert --Armenia--.

Column 12, line 16: after "circuitry," insert --as--; and
          line 20: after "41" insert --,--.
Column 17, line 62: after "respectively" insert --:--.

Signed and Sealed this

Twenty-second Day of April, 1997

*Attest:*

BRUCE LEHMAN

*Attesting Officer*  Commissioner of Patents and Trademarks